United States Patent [19]
Osmani et al.

[11] Patent Number: 5,815,807
[45] Date of Patent: Sep. 29, 1998

[54] DISPOSABLE WIRELESS COMMUNICATION DEVICE ADAPTED TO PREVENT FRAUD

[75] Inventors: Rashid Masood Osmani, Mundelein; Michael P. Metroka, Algonquin, both of Ill.

[73] Assignee: Motorola, Inc., Schaumburg, Ill.

[21] Appl. No.: 594,978

[22] Filed: Jan. 31, 1996

[51] Int. Cl.[6] .............................. H04Q 7/32; H04M 9/00
[52] U.S. Cl. ......................... 455/410; 455/407; 455/410; 455/550; 455/575
[58] Field of Search ..................................... 455/410, 405, 455/406, 407, 409, 550, 565, 572, 573; 379/144, 114, 145, 91

[56] References Cited

U.S. PATENT DOCUMENTS

| | | | |
|---|---|---|---|
| 4,776,000 | 10/1988 | Parienti | 455/407 |
| 5,046,082 | 9/1991 | Zicker et al. | 455/410 |
| 5,203,009 | 4/1993 | Bogusz et al. | |
| 5,303,297 | 4/1994 | Hills | 455/406 |
| 5,353,335 | 10/1994 | D'Urso et al. | 379/144 |
| 5,455,863 | 10/1995 | Brown et al. | 455/410 |
| 5,461,664 | 10/1995 | Cappadona | 455/550 |
| 5,504,808 | 4/1996 | Hamrick, Jr. | 379/144 |
| 5,631,947 | 5/1997 | Wittstein et al. | 455/409 |
| 5,706,338 | 1/1998 | Relyea et al. | 379/145 |
| 5,761,624 | 10/1991 | Mooney et al. | 455/406 |

FOREIGN PATENT DOCUMENTS 2262685  12/1991  United Kingdom.

OTHER PUBLICATIONS

Cohn Sima, Cellular Phone of Disposable type, PCT.

*Primary Examiner*—William Cumming
*Assistant Examiner*—Jean A. Gelin
*Attorney, Agent, or Firm*—Kevin D. Kaschke

[57] ABSTRACT

A disposable portable radiotelephone subscriber unit (101) comprises a power supply (255), a transceiver (205, 207) and a controller (215). The power supply (255) has stored therein a predetermined measure of power capacity (281). The transceiver (205, 207) is permitted to operate for a predetermined period of time (405) responsive to the predetermined measure of the power capacity (281). The controller (215) monitors a rate of depletion of the predetermined measure of the power capacity (281). The controller (215) permits operation of the transceiver (205, 207) when the power capacity (281) is being depleted at a desirable rate, thereby decreasing the predetermined period of time (405) that the transceiver (205, 207) is permitted to operate. The controller (215) prevents operation of the transceiver (205, 207) when the power capacity (281) is being depleted at an undesirable rate, thereby prolonging the predetermined period of time (405) that the transceiver (205, 207) is permitted to operate. Alternatively, the power supply (255) may be a memory unit (259) and the power capacity (281) may be calling time (279) or a future electronic date (275).

85 Claims, 10 Drawing Sheets

100

CALL SEQUENCE MESSAGE

| WORD | INFORMATION ELEMENT | LENGTH |
|---|---|---|
| A | F | 1 |
| A | NAWC | 3 |
| A | T | 1 |
| A | S | 1 |
| A | E | 1 |
| A | ER | 1 |
| A | SCM | 4 |
| A | MIN1 | 24 |
| A | P | 12 |
| B | F | 1 |
| B | NAWC | 3 |
| B | LOCAL | 5 |
| B | ORDQ | 3 |
| B | ORDER | 5 |
| B | LT | 1 |
| B | EP | 1 |
| B | SCM | 1 |
| B | MPCI | 2 |
| B | SDCC1 | 2 |
| B | SDCC2 | 2 |
| B | MIN2 | 10 |
| B | P | 12 |
| C | F | 1 |
| C | NAWC | 3 |
| C | ESN | 32 |
| C | P | 12 |

*FIG. 9*   900

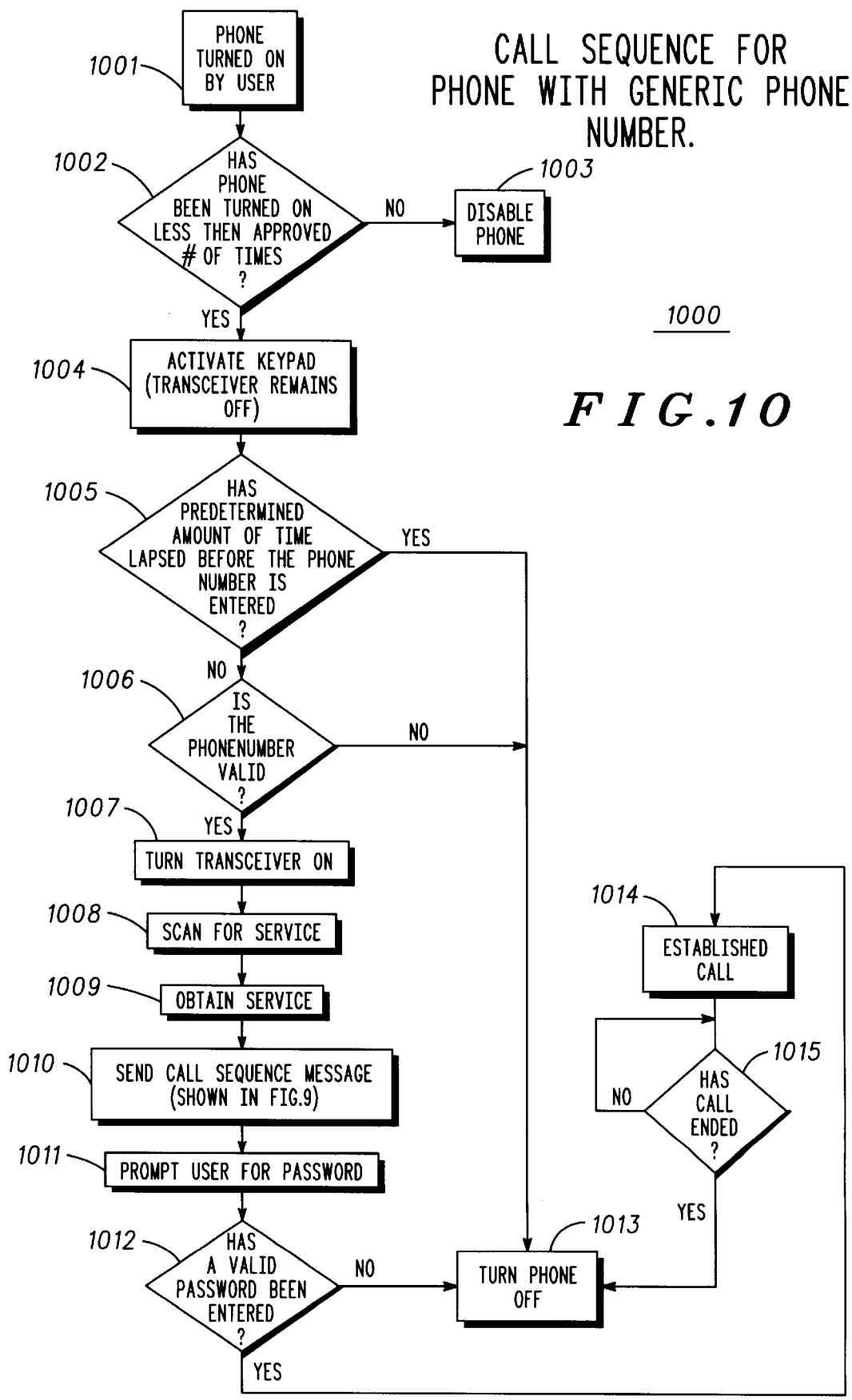

DISPOSABLE WIRELESS COMMUNICATION DEVICE ADAPTED TO PREVENT FRAUD

CROSS-REFERENCE TO RELATED APPLICATIONS

The present patent application is related to U.S. patent application having Ser. No. 08/594,218 filed on the same date herewith and assigned to the assignee of the present invention.

FIELD OF THE INVENTION

The present invention relates generally to wireless communication devices and, more particularly, to a disposable wireless communication device adapted to prevent fraud.

BACKGROUND OF THE INVENTION

A wireless communication device operates in a wireless communication system to provide a user of the device with portable communications. A wireless communication device communicates with the wireless communication system or other wireless communication devices via electromagnetic signals, such as those in the radio frequency (RF) range, for example. The wireless communication device may communicate voice, data, or video. The format of the electromagnetic signal communicated between the wireless communication device and the wireless communication system or other devices may be either analog or digital. Examples of such wireless communication devices comprise, without limitation, radiotelephones, pagers, two-way radios, personal data assistants, and personal computers. The radiotelephones comprise cellular and cordless subscriber units.

Since wireless communication devices are indeed portable, they operate off of portable power supplies such as batteries. The batteries have a predetermined power capacity available. After the predetermined power capacity is spent, the wireless communication device becomes inoperable. The battery must be recharged or replaced before the wireless communication device can operate again.

Billing services for radiotelephone subscriber units include prepaid short term billing structures such as calling cards and debit cards and postpaid periodic billing structures. Cellular communication systems are owned and operated for profit by communications companies who typically sell use of the system based on the amount of time spent by the user on the system and the distance involved between the communicating locations. Users may lease or buy cellular phones in order to use them on the system. Typically, in order to successfully complete phone calls on the cellular phone system, a user has to be within a cellular coverage area, pay his phone bill regularly and ensure that the radiotelephone is operational. An advantage of a conventional radiotelephone system is that it enables users to share the use of the system thereby making the cost affordable.

In a conventional cellular communication system as soon as a cellular radiotelephone is turned on it scans a predetermined set of frequency channels associated with the particular cellular communication system that it considers as its primary service provider. It selects the strongest channel from among those scanned and dwells on it. Conventional cellular radiotelephones are designed to make outgoing calls and accept incoming calls. When a cellular radiotelephone is the call initiator, the user dials the phone number desired. The information is conveyed to a cellular communication system switching office through a base station and the call is routed to its destination. When a cellular radiotelephone is the call recipient, the cellular communication system pages it and establishes radio communications with it, if the cellular radiotelephone responds to the page. Oftentimes, when cellular radiotelephones are not turned on, the cellular communication system has prior knowledge about the state of the cellular radiotelephone and does not bother to page it. The prior knowledge is obtained by a process called system registration. Generally, cellular radiotelephones are directed to register on the system as soon as they are turned on and have established service on the cellular communication system. The registration process is typically repeated periodically. The communications load of a cellular communication system is greatly determined by the registration and paging processes.

A cellular radiotelephone subscriber unit has two unique numbers: an electronic serial number (ESN) and a mobile identification number (MIN). Both numbers are stored in separate memory locations in a microprocessor in the radiotelephone. The ESN is assigned by the manufacturer of the radiotelephone at the time of manufacture. The ESN is usually an encrypted number and cannot be changed or altered except by the manufacturer of the radiotelephone. If the ESN is some how altered, erased or otherwise damaged, either intentionally or by the cellular phone microprocessor acting in response to fraud attempts, the radiotelephone is disabled. The MIN is assigned by the radiotelephone system operator when the radiotelephone is activated for service. The radiotelephone system primarily uses the MIN to page the radiotelephone in the radiotelephone system so that a particular radiotelephone can receive an incoming call. When a radiotelephone attempts to make a call in a radiotelephone system, it transmits both the ESN and MIN to the radiotelephone system. The radiotelephone system compares the ESN and MIN with data in the radiotelephone system to validate the call attempt to prevent fraudulent use of the radiotelephone system.

In any given service area, more than one cellular company operates its own cellular system and competes with another cellular company for service. In addition to the ESN and MIN, each cellular telephone also has another set of numbers in what is commonly referred to as a number assignment module (NAM). These numbers include a system identification number (SID), priority level, etc. Cellular telephones assigned to a particular system share a common SID number. Competing cellular companies allow users from other systems to obtain service on their system by means of a process commonly referred to as roaming. Roaming charges are generally higher than charges for home system usage. Further, when cellular phones attempt long distance telephone calls, they are charged separately for them in addition to the regular air time charges.

While the benefits of normal cellular phone usage provide convenient communications, some users of cellular systems prefer to use cellular radiotelephones only in emergency or limited use situations. Such users do not necessarily benefit from buying a full-featured cellular phone because they must pay a monthly service fee even if the cellular phone is not used.

As cellular systems expand, more and more users are subscribing to cellular service. Cellular systems in many places are running out of capacity and investigating ways to increase capacity. Phone companies are also running out of MINs and are having to introduce new area codes. Infrequent users should not be penalized by having to subscribe to long term normal billing service and indirectly support the infrastructure for features in the system that they do not use.

Likewise, the infrastructure should not be burdened by infrequent users.

One solution to these problems is a cellular phone that is required to call a pre-programmed emergency number before calling any other number. However, a disadvantage of cellular phones designed to work only by first calling an emergency number before calling a second pre-programmed number is that it places an undue hardship on the user's flexibility. A user may experience an emergency that is of a nature requiring a call to be made to a location other than the one pre-programmed as the second number. In some cases, the pre-programmed second number may not elicit a response. An emergency may also be of such a nature, that it does not warrant a call to be made to the first pre-programmed number, yet be of sufficient need to require that a call be placed.

Conventional land line phones with restrictions on use, such as only for incoming or only for outgoing calls, are known. Cellular phones also exist that have limitations on use that can be programmed into the phone by the cellular phone operator or by the user. However, conventional land-line phones having restrictions on use employ techniques that cannot be directly adopted for cellular phones because of the unique nature of wireless cellular telephony and because of the need to prevent fraudulent use.

Therefore, cellular phones suffer from a disadvantage of having phones with a preponderance of unused features for a category of users who, for various reasons, desire only limited and sporadic access to the cellular phone system.

Accordingly, there is a need for a class of cellular radio-telephones having a fraud prevention apparatus and method and having restricted operating characteristics.

BRIEF DESCRIPTION OF THE DRAWINGS

FIG. 9 illustrates a call sequence message having a generic phone number according to a fourth embodiment for use with the wireless communication device of FIG. 2.

FIG. 10 illustrates a flow chart in accordance with a fourth embodiment for operating the wireless communication device of FIG. 2.

DETAILED DESCRIPTION OF THE PREFERRED EMBODIMENTS

The first, second and third embodiments of the present invention, as described in general in FIGS. 1, 2, 3 and 4 and in detail in FIGS. 5–8, generally describe a disposable wireless communication device adapted to prevent fraud by a user. The wireless communication device is disposable in the sense that it is intended for a "single-use" and then be thrown away. Single-use for a disposable wireless communication device means that the duration of use permitted for the wireless communication device is predetermined. Therefore, once the predetermined duration of use has been consumed, the disposable wireless communication device becomes inoperable. The first, second and third embodiments of the present invention describe an apparatus and method which prevents a user of the disposable wireless communication device from fraudulently extending the predetermined duration of use allowed for the disposable wireless communication device.

Figure 1:
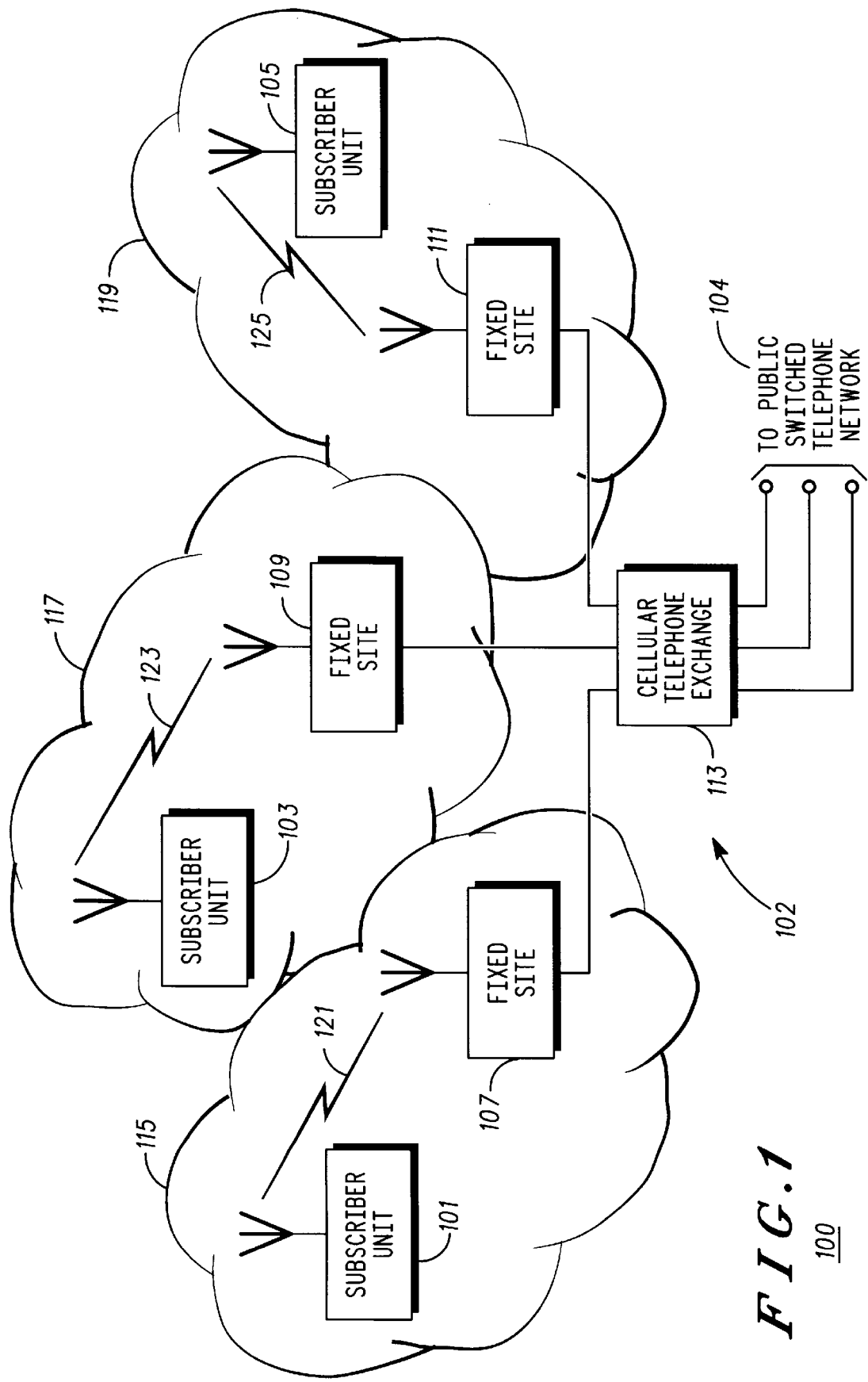
FIG. 1 illustrates a block diagram of a wireless communication system.
Figure 2:
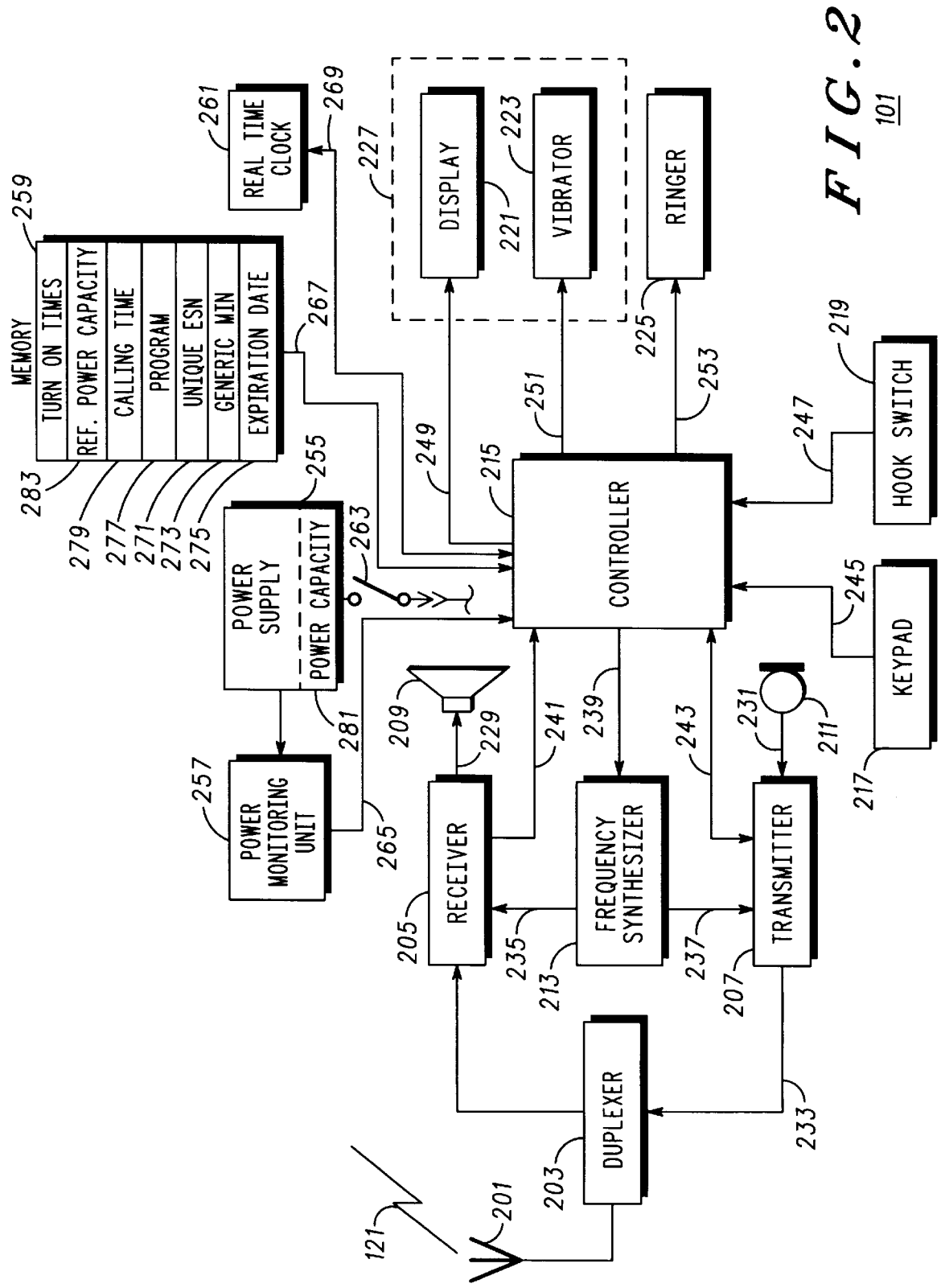
FIG. 2 illustrates a block diagram of a wireless communication device for use in the wireless communication system of FIG. 1.

The fourth embodiment of the present invention, as described in general in FIGS. 1 and 2 and in detail in FIG. 9 and 10, generally describes a radiotelephone having a generic mobile identification number (MIN) or phone number. The phone number is generic in the sense that it is common to a phone number of at least one other radiotelephone in the same system. Radiotelephones having generic phone numbers can place outgoing calls because the system recognizes their unique electronic serial number (ESN) and can be easily adapted to accept the generic phone numbers. However, radiotelephones having generic phone numbers cannot receive incoming calls because the system cannot distinguish between various radiotelephones having the same phone number. Although limiting a radiotelephone to only outgoing calls restricts the operation of the radiotelephones, the burden of paging on the system is significantly reduced and no unique phone numbers are needed. Since a unique phone number is substituted with a generic phone number, the system operation remains the same. A significant advantage of this arrangement is that many radiotelephones of this type can be sold in the system without having to assign phone numbers to them. Likewise, radiotelephones of this type do not increase the paging traffic in the system. The fourth embodiment is not necessarily dedicated for use with disposable radiotelephones. However, the fourth embodiment is conveniently adapted for use with disposable radiotelephones because many disposable radio-telephones can be sold in the system without consuming scarce phone numbers and valuable paging traffic.

Note that the four embodiments may be used individually or in combination in a wireless communication device. Any combination of the four embodiments may be used.

FIG. 1 is a block diagram of a communication system 100. The communication system of FIG. 1 generally comprises a wireless communication system 102 coupled to a wireline communication system 104. The wireless communication system 102 generally comprises a switch 113 coupled to a plurality of fixed sites 107, 109 and 111, and a plurality of wireless communication devices 101, 103 and 105. The communication system 100 provides communications between the wireline communication system 104 and one or more wireless communication devices 101, 103 and 105.

The wireless communication system 102 is preferably a radiotelephone system, and in particular, a cellular radio-telephone system. Alternatively, the wireless communication system 102 may comprise, without limitation, a cordless radiotelephone system, a satellite communication system, a paging system, a trunked radio system or a personal communication system (PCS).

The wireless communication devices 101, 103 and 105 are preferably radiotelephone subscriber units 101, 103 and 105, and in particular, cellular radiotelephone subscriber units. Alternatively, the wireless communication devices 101, 103 and 105 may comprise, without limitation, cordless radiotelephones, pagers, two-way radios, personal data assistants, and personal computers. In the preferred embodiment of the present invention, the wireless communication devices 101, 103 and 105 are portable devices that operate in a wireless communication system 102 to advantageously provide users of the devices 101, 103 and 105 with portable communications.

In the preferred embodiments of the present invention, the wireless communication devices 101, 103 and 105 communicate with one of the plurality of fixed sites 107, 109 and 111 via electromagnetic signals 121, 123 and 125, such as those in the radio frequency (RF) range, for example. In the preferred embodiments, the radio frequency signals 121, 123 and 125 are radiotelephone calls transmitted and received by the radiotelephones 101, 103 and 105. The wireless communication devices 101, 103 and 105 may communicate voice, data or video. The format of the electromagnetic signal communicated between the wireless communication devices and the fixed sites 107, 109 and 111 may be either analog or digital. Alternatively, the electromagnetic signals 121, 123 and 125 may be infra-red signals, for example.

In the preferred embodiments of the present invention, each wireless communication device 101, 103 and 105 has a unique electronic serial number to access the communications link which would couple the wireless communication device 101, 103 and 105 to the appropriate telephone line.

In the preferred embodiments of the present invention, the fixed sites 107, 109 and 111 are land-base stations. The wireless communication devices 101, 103 and 105 communicate with the fixed sites 107, 109 and 111, which in turn, couple two-way communication through a switch 113. In the preferred embodiments of the present invention, the fixed sites 107, 109 and 111 provide communications, throughout discrete radio coverage areas 115, 117, and 119, respectively, enabling the wireless communication devices 101, 103 and 105 to communicate with the wireless communication system 102 over a wide geographic area. Alternatively, the fixed sites 107, 109 and 111 may comprise satellites orbiting about the earth to communicate either directly with the wireless communication devices 101, 103 and 105 or through other land-base stations. Cellular calls may be handed off between different fixed sites 107, 109 and 111 as the user moves through the discrete radio coverage areas 115, 117, and 119.

In the preferred embodiments of the present invention, the switch 113 is a telephone exchange, and in particular, a cellular telephone exchange. Alternatively, the switch 113 may be a cordless telephone exchange such as used in PCS systems. In the preferred embodiment of the present invention, the switch 113 performs the operation of call placement, control, and interconnection with the wireline communication network 104 as is well known in the art.

Generally, the fixed sites 107, 109 and 111, the switch 113 and the wireline communication network 104 are individually well known in the art, and hence no additional description need be provided here except as may be necessary to facilitate the understanding of the present invention.

Industry standards regulate the manner in which cellular radiotelephones 101, 103 and 105 work and how they interact with fixed sites 107, 109 and 111 of a cellular system 100. For example, one such standard, herein incorporated by reference, is EIA/TIA Interim Standard, Cellular System Dual-Mode Mobile Station —Base Station Compatibility Standard, IS-54-B, April 1992 (herein referred to as "IS-54 Standard"). The IS-54 Standard is published and available from Telecommunications Industry Association, Engineering Department, 2001 Pennsylvania Avenue N.W., Washington, D.C. 20006.

FIG. 2 illustrates a block diagram of one of the wireless communication devices 101, 103 or 105, such as 101 for example, as shown in the wireless communication system of FIG. 1. The wireless communication device 101, configured as a radiotelephone in the preferred embodiment, generally comprises an antenna 201, a duplexer 203, a receiver 205, a transmitter 207, a speaker 209, a microphone 211, a frequency synthesizer 213, a controller 215, a power supply 255, a keypad 217, a hook switch 219, a silent alert generator 227, and an audible alert generator 225, a power monitoring unit 257, a memory unit 259, a real time clock 261 and a switch 263. The silent alert generator 227 may comprise a visual alert generator 221 or a tactile alert generator 223. Generally, the antenna 201, the duplexer 203, the receiver 205, the transmitter 207, the speaker 209, the microphone 211, the frequency synthesizer 213, the controller 215, the power supply 255, the keypad 217, the hook switch 219, the silent alert generator 227, and the audible alert generator 225 are each individually well known in the art, and hence no additional description need be given except as may be necessary to facilitate the understanding of the present invention.

Radiotelephones advantageously offer the flexibility of free movement afforded by radio communications. Radiotelephones can be used in cars where they can be made an integral part of the car's electronic system or they may be small enough in size to be carried around by the user. In the preferred embodiments, the radiotelephone 101 is generally referred to as a portable radiotelephone.

The antenna 201 transmits and receives radio frequency (RF) signals via the duplexer 203. The duplexer 203, coupled to both the transmitter and the receiver, permits RF signals to be transmitted and received at the same time without interfering with one another. To facilitate two-way communication, the radiotelephone 101 uses both the transmitter 207 and the receiver 205 to form a transceiver 205, 207. Alternatively, the wireless communication device 101 may also comprise only one of the transmitter 207 or the receiver 205. A pager would comprise only the receiver 205, for example.

The receiver 205 is coupled to the duplexer and is operative to receive a desired signal 121 to produce a received signal at line 229. The receiver 205 includes circuitry to recover the original information signal from the signal transmitted from a base station. The functions that are commonly implemented in the receiver are reference signal generation, demodulation, amplification, filtering and detecting.

The speaker 209 is coupled to receive the received signal and operative to generate an acoustic signal for a user of the radiotelephone to hear. The microphone 211 receives an acoustic spoken by the user to produce an input signal at line 231.

The transmitter 207 is coupled to receive the input signal at line 231 and operative to produce a transmitted signal at line 233. The transmitter 207 includes circuitry for conversion of information signals into electrical signals and further processing them into a form suitable for transmission over the communication channel. Such processing frequently involves functions commonly referred to as signal generation, modulation, amplification and filtering. Various schemes for accomplishing each of these tasks are available to those skilled in the art. For example, modulation may take the form of amplitude modulation, frequency modulation, phase modulation or any combination of these.

The controller 215 is coupled to the frequency synthesizer 213, the receiver 205 and the transmitter 207 and operable to communicate control signals via lines 239, 241 and 243, respectively. The controller 215 is generally a microprocessor, such as, for example, a type 68HC11 manufactured by and available from Motorola Inc, Austin, Tex. The controller 215 may be integrated with the battery monitoring unit 257, the memory unit 259 and the real time clock 261 to form a single chip. The frequency synthesizer 213 is coupled to both the receiver 205 and the transmitter 207 and operable to provide frequency reference signals at lines 235 and 237, respectively.

The keypad 217 and the hook switch 219 are coupled to the controller 215 and operable to provide input control signals via lines 245 and 247, respectively. The power monitoring unit 257, the memory unit 259 and the real time clock 261 also provide inputs to the controller 215 at lines 265, 267 and 269. The controller 215 is coupled to the silent alert generator 227 and the audible alert generator 225 and operable to provide output control signals via lines 249 and 251, and 253, respectively.

Generally, the memory 259 has stored therein a program 277 that dictates the operating characteristics of the radiotelephone 101. It also includes a unique and encrypted identifying number such as an electronic serial number (ESN) 271 and a generic mobile identification number (MIN) 273, and an electronic expiration date 275. The memory 259 is preferably read only memory (ROM) which cannot be altered after it has been programmed. Preferably, the ESN and MIN are hard coded into ROM. Alternately, other types of memory, such as electrically erasable programmable read only memory (EEPROM), may be used as is well known in the art.

The circuitry of the radiotelephone 101 also requires power from the power supply 255 that is portable. Many types of conventional batteries, such as alkaline, nickel cadmium, lithium and nickel metal hydride, for example, are available to fulfill this requirement.

A power monitoring unit 257 monitors the power capacity of the power supply 255 and provides a measure of the power capacity and consumption to the controller 215 at line 265. The power monitoring device may be of the type BQ2001 Energy Management Unit made by and available from Benchmark, Carrollton, Tex. The BQ2001 is a low power consumption circuit that directly measures battery charge consumption and capacity.

The switch 263 couples the power supply to all the circuitry of the radiotelephone 101 that need power. In particular, the switch supplies power to the controller 215, the transmitter 207 and the receiver 205. In the preferred embodiment, the switch 263 is manually operated by a user of the radiotelephone 101. The purpose of the switch is to minimize the power drain on the power supply 255 when the radiotelephone 101 is not in use.

The real time clock 261 measures elapsed time and couples the amount of elapsed time to the controller at line 269. The real time clock 261 is shown in FIG. 2 as a separate block. However, the real time clock 261 may also be an integral part of the controller 215. The initial time value of the real time clock 261 may be set by the manufacturer of the radiotelephone 101 using the controller 215 via line 269. Alternately, the radiotelephone 101 may be informed of the time setting of the real time clock 261 by the radiotelephone system 102 over a radio communication link 121.

In the preferred embodiment, the radiotelephone 101 may be disabled in several ways. One way is for the program 277 stored in the memory 259 to interrupt normal operation of the radiotelephone 101. This could result in the radiotelephone 101 not turning on, not communicating with the radiotelephone system 100, or not responding to any user initiated actions from the keypad 217 or hookswitch 219, for example. The display 221, if available, may inform the user of this inoperative condition. Another way is for the controller 215 to destroy the ESN 271, the generic MIN 273, the expiration date 275, or scramble the program 277. Another way is for the radiotelephone system 102 to simply deny service to the radiotelephone 101. Other methods of rendering the radiotelephone 101 inoperative will be readily known to those skilled in the art. Thus, the radiotelephone may be either temporarily disabled or permanently disabled.

In the context of a radiotelephone 101 that is disposable, the radiotelephone 101 needs to be manufactured as inexpensively as possible. Cost goals may be achieved by limiting the hardware to only those necessary functions. For example, the following hardware can be eliminated from a conventional radiotelephone: alerts such as the ringer 225 and the vibrator 223, the display 221 and its associated drive circuitry, the display and keypad backlighting, volume adjust keys, keypad keys such as SND, RCL, STO, MENU, FCN, etc., an external connector, a retractable antenna, a moveable housing such as a flap element, a reverse polarity diode adapted for a removable battery, external bus interface circuits, etc. The housing of the radiotelephone 101 could be made of cardboard.

The present invention envisions a radiotelephone 101 that is made so inexpensively that it can easily be thrown away after its useful life has ended. The disposable radiotelephone 101 would be sold to a customer for a one time charge, up front fee. The one time charge would include both the price of the disposable radiotelephone 101 and a service contract for a predetermined amount of time or usage. The prepaid service contracts can be offered in a variety of increments such as 100 minutes, 200 minutes, etc. Therefore, the customer doesn't have the inconvenience and expense of a monthly bill and the expense of purchasing a permanent radiotelephone unit. After the predetermined service contract expires, the radiotelephone is disposed of.

The applications for disposable radiotelephones according to the present invention are many. Since there would not be a monthly service charge, the phones may be kept for quite a long time for use only in the case of an emergency or for security. They may be located in remote places such as parking lots where land line phone service is not available, placed in the tool box or a glove box of a car, carried in a child's book bag, while exercising or hiking in remote areas etc. Disposable radiotelephones would make great gifts for friends and family. Travelers could buy a disposable radiotelephone instead of renting a conventional radiotelephone when touring a new city. The disposable radiotelephones could be sold in vending machines and available 24 hours a day to those in need.

Although, the present disclosure describes a radiotelephone that is disposable, the radiotelephone may also be recycled for use by the same user or by another user. For example, a user may be able to call a toll free number to the radiotelephone system operator to get the calling capacity of the radiotelephone reset by giving the operator a credit card number. The toll free number may need to be called before the predetermined use has expired in order to ensure that a phone call can be made. Alternatively, the radiotelephone may be designed with a margin of reserve calling capacity that would enable a user to make "one last call" only to the toll free number in order to ask the operator to reset the calling capacity of the radiotelephone. However, resetting the calling capacity is only possible if the calling capacity of the radiotelephone is determined by the radiotelephone system provider. As another example, a user may be able to return the radiotelephone to the manufacturer for a portion of the original cost of the radiotelephone after its calling capacity has been expended. The manufacturer could, in turn, discard the shell and reuse the inner circuitry. The recycled radiotelephone could then be resold to another customer.

When the predetermined calling capacity is determined by circuitry in the radiotelephone itself a potential for fraud arises. Dishonest users would investigate to determine how to lengthen the predetermined amount of time that the disposable radiotelephone could make calls. A potential for fraud would make service providers very uncomfortable, since successful fraud would cost them money. Therefore, a tradeoff becomes apparent. The system providers can keep total control over the usage of the calling capacity of a disposable telephone and not worry about users fraudulently extending the calling capacity. This can be done by implementing a call timer at the system level. However, the computational load on the system provider could become very great if the number of disposable telephones in the market is large. In essence the system provider would be required to track many disposable radiotelephones, each one of which would be used very little. On the other hand, if the system provider places the responsibility for monitoring calling capacity at the subscriber unit, there is a potential for fraud. One aspect of the present invention provides solutions to the perpetration of fraud when the responsibility for monitoring calling capacity is at the radiotelephone subscriber unit.

Figure 3:
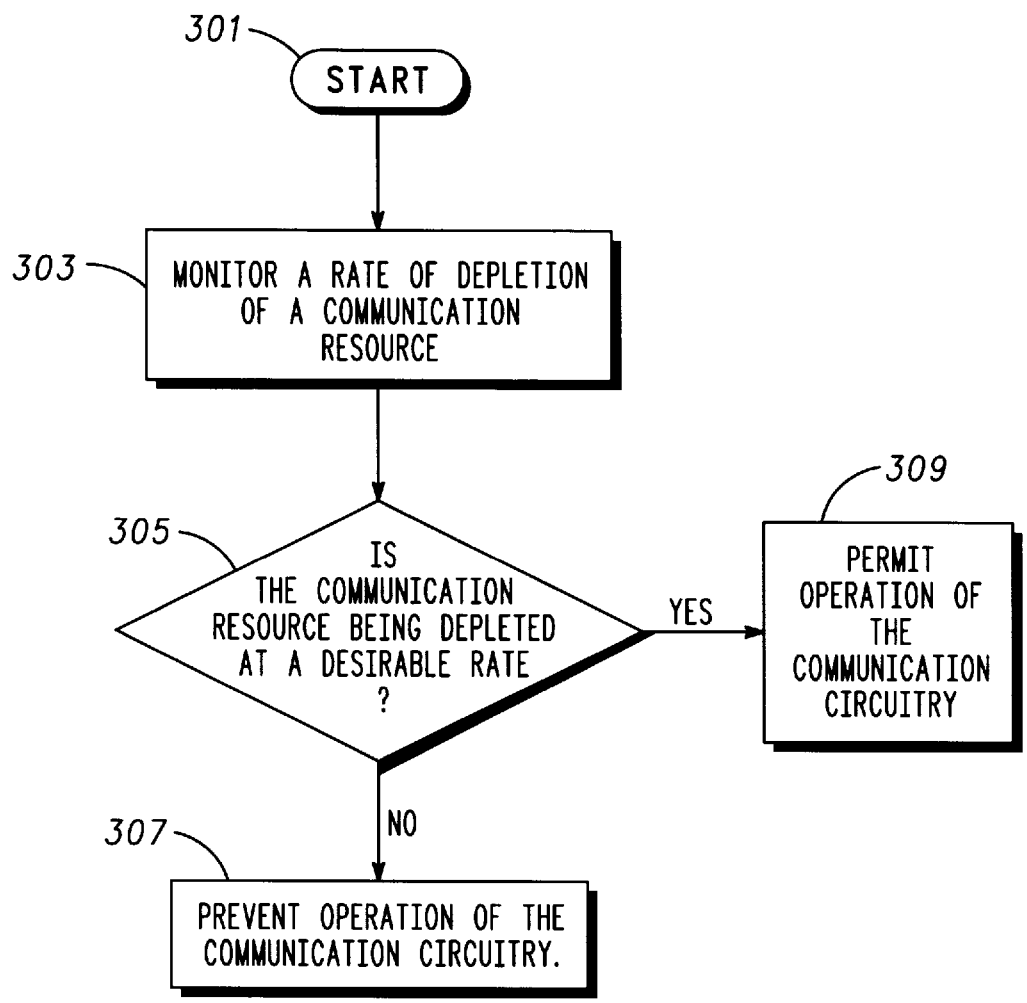
FIG. 3 illustrates a flow chart for operating the wireless communication device of FIG. 2.

FIG. 3 illustrates a flow chart 300 for operating the wireless communication device 101 of FIG. 2. The flow chart 300 generally describes a method for preventing fraudulent lengthening of calling capacity in the radiotelephone subscriber unit 101. According to the method of FIG. 3, the disposable wireless communication device comprises a storage unit, communication circuitry and a controller. The storage unit has stored therein a predetermined measure of a communication resource. Generally, the communication resource is any parameter that is expended over time, but is needed for the radiotelephone to operate. The communication circuitry is operatively coupled to the storage unit and is permitted to operate for a predetermined period of time responsive to the predetermined measure of the communication resource. The controller 215 is operatively coupled to the storage unit and the communication circuitry.

At step 301, the flow chart starts. At step 303, the controller 215 monitors a rate of depletion of the communication resource. At step 305, the controller determines whether the rate of depletion is desirable or undesirable. If the rate of depletion is desirable, then, at step 309, the controller 215 permits operation of the communication circuitry, thereby decreasing the predetermined period of time that the communication circuitry is permitted to operate. If the rate of depletion is undesirable, then, at step 307, the controller 215 prevents operation of the communication circuitry, thereby prolonging the predetermined period of time that the communication circuitry is permitted to operate. Operation prevention techniques are discussed hereinabove with reference to FIG. 2.

In the preferred embodiment, the controller 215 may determine that the communication resource is being depleted at the undesirable rate, at step 305, when one of several conditions occur. One condition is when the communication resource is restored, thereby increasing the predetermined period of time that the communication circuitry is permitted to operate. The restored level of the communication resource may be reset back where it started or just higher than where it was in the past. Another condition is when the communication resource is maintained, thereby maintaining the predetermined period of time that the communication circuitry is permitted to operate. If the communication resource never depletes, the predetermined period of time that the communication circuitry is permitted to operate would be infinite. Still another condition is when the communication resource is being depleted at a rate slower than a predetermined rate of depletion, thereby prolonging the predetermined period of time that the communication circuitry is permitted to operate. If the communication resource depleted at a slower rate than normal, the predetermined period of time that the communication circuitry is permitted to operate would be extended although not for ever.

Thus, the communication resource is being depleted at the undesirable rate when it is determined not to be depleting properly. Undesirable, improper depletion is when the predetermined time period, during which the communication circuitry is permitted to operate, is not decreasing like one would expect it to under normal circumstances. Increasing, maintaining or slowing the rate of depletion is improper and assumed fraudulent. When the controller 215 tracks the depletion of the communication resource in the manner described in FIG. 3 fraud is detected and prevented. Desirable, proper depletion is when the rate of depletion is when the predetermined time period, during which the communication circuitry is permitted to operate, is gradually decreasing at an expected rate of depletion. A term coined for monitoring this depleting communication resource is called the "falling ceiling" approach to fraud prevention. Likewise, from a different reference point it could also be called the "rising floor" approach. Either way the room eventually gets smaller. In either case, the communication resource must be properly depleting in order for the radiotelephone to remain operational. If the controller 215 detects that it is not properly depleting, the radiotelephone is disabled.

In a first embodiment of the present invention, the storage unit is the power supply 255 and the communication resource is power capacity of the power supply 255. The first embodiment will be described in more detail with reference to FIG. 5. In the second and third embodiments of the present invention, the storage unit is the memory unit 259 and the communication resource is time. In the second embodiment of the present invention, the time is a future date in time. The second embodiment will be described in more detail with reference to FIG. 7. In the third embodiment of the present invention, the time is communication time, such as talk time. The third embodiment will be described in more detail with reference to FIG. 8.

In a first preferred embodiment of the present invention, the communication circuitry further comprises radiotelephone circuitry, such as a transceiver. Alternatively, the communication circuitry may comprise pager circuitry, such as a receiver.

Figure 4:
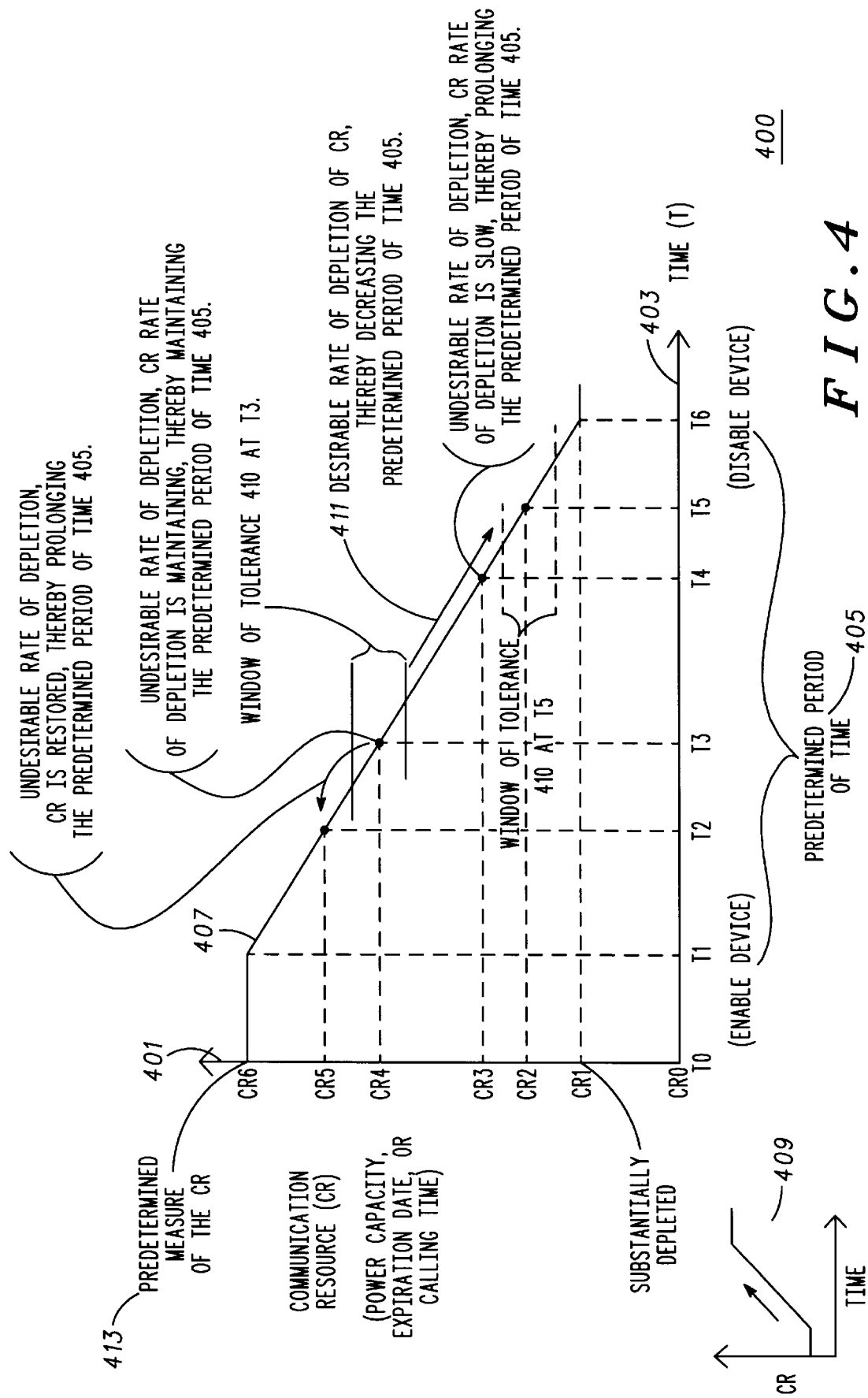
FIG. 4 illustrates a graph to help explain the flow chart of FIG. 3.

FIG. 4 illustrates a graph 400 to explain the flow chart of FIG. 3. The graph 400 depicts the communication resource (CR), for example, power capacity 281, expiration date 275 or calling time 279, on the vertical axis 401 and time on the horizontal axis 403. The vertical axis 401 shows six points, CR1–CR6, designated from a predetermined measure of the CR at CR6 to a substantially depleted CR at CR1. The horizontal axis 403 shows six points, T1–T6, designated from time T1 wherein the radiotelephone 101 is enabled to T6 wherein the radiotelephone 101 is disabled. The difference between times T6 and T1 is a predetermined period of time 405 during which the radiotelephone 101 is permitted to operate. The slope 407 of the graph 400 shows the CR decreasing as time increases. This is purely a matter of perspective and reference for the sake of discussion purposes. The slope could just as easily been drawn with a different perspective and reference with the CR increasing as time increases as shown in reference graph 409.

By example, begin at T1 wherein the CR is at its highest level at CR6. Then, at T3, the CR depletes to a level of CR4. At T3, a window of tolerance 410 is shown both above and below CR4. The window of tolerance 410 takes into account the effects of temperature, aging, tolerance, etc. on the parts in the radiotelephone 101. The window of tolerance 410 provides some cushion so that the controller 215 does not accidentally disable the radiotelephone circuitry.

In this example, the normal path for CR depletion is down the slope 407 from CR4 at T3. However, consider that a user could try to restore the measure of CR to a fraudulent level of CR5 at T2, thereby increasing the predetermined period of time 405 during which the radiotelephone is permitted to operate from T6–T3 to T6–T2. This unauthorized increase in time would cause the radiotelephone system operator to provide service for time that was not and will never be paid for. Therefore, a move of CR from CR4 at T3 to CR5 at T2 is detected by the controller 215 as an undesirable rate of depletion and the radiotelephone 101 is immediately disabled. Method for disabling are described hereinabove with reference to FIG. 2.

Further, consider that a user could try to maintain the measure of CR at a fraudulent level of CR4 at T3, thereby maintaining the predetermined period of time 405 during which the radiotelephone is permitted to operate. This unauthorized maintenance of time would also cause the radiotelephone system operator to provide service for time that was not and will never be paid for. The predetermined period of time 405 would remain constant at T6–T3. Therefore, the maintaining of the CR at CR4 at T3 is detected by the controller 215 as an undesirable rate of depletion and the radiotelephone 101 is immediately disabled. Method for disabling are described hereinabove with reference to FIG. 2.

Under normal use, the radiotelephone the CR depletes at a desirable rate as shown by arrow 411 from CR4 at T3 to CR2 at T5. Again, the window of tolerance 410 follows the level of the CR down the slope 407 to CR2 at T5.

Further, consider that the CR depletes a slower than normal rate. A user could try to retard the depletion of the CR at a fraudulent rate, wherein instead of being at a level of CR2 at T5, the CR is at a level of CR3 at T4. Slowing the rate of depletion below what is normally expected by the controller 215 prolongs the predetermined period of time 405 during which the radiotelephone 101 is permitted to operate. The user would gain the value of the predetermined time period by a time T5–T4. This unauthorized prolonging of time would again cause the radiotelephone system operator to provide service for time that was not and will never be paid for. Therefore, retarding the CR to CR3 at T4 is detected as an undesirable rate of depletion by the controller 215 and the radiotelephone 101 is immediately disabled.

When the CR reaches CR1 at T6, the CR is substantially depleted, the radiotelephone 101 no longer has enough of the CR to operate properly and the radiotelephone circuitry is disabled. Therefore, a radiotelephone utilizing this aspect of the present invention, drives the communication resource to depletion over time.

For added security the program 277 that runs the fraud prevention method, the ESN 271, MIN 273, expiration date 275, calling time 279, reference power capacity 283, etc. are preferably hard coded into ROM. Therefore, the program and its input parameters share a common chip die and cannot be separated.

Figure 5:
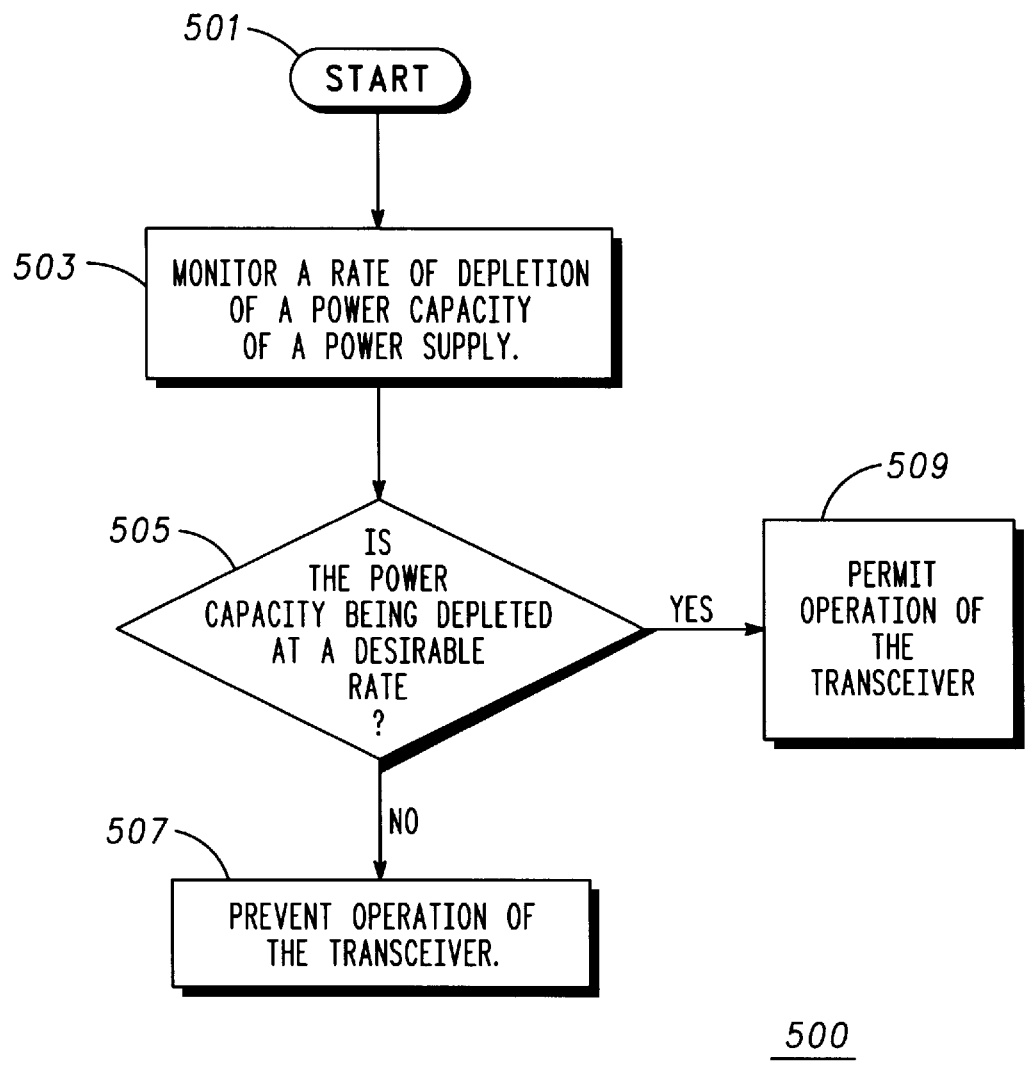
FIG. 5 illustrates a first embodiment of the flow chart of FIG. 3.

FIG. 5 illustrates a first embodiment of the flow chart of FIG. 3. Referring briefly to FIG. 2, in the first embodiment the disposable portable radiotelephone subscriber unit 101 comprises the power supply 255, the transceiver 205 and 207 and the controller 215. The power supply 255 has stored therein a predetermined measure of power capacity 281. Preferably, in the first embodiment, the power supply 255 is a battery and the predetermined measure of the power capacity comprises a predetermined measure of voltage of the battery. The battery being used with the communications device is preferably non-rechargeable and an integral part of the enclosure of the radiotelephone. The transceiver 205 and 207 is operatively coupled to the power supply 255 and permitted to operate for a predetermined period of time 405 responsive to the predetermined measure of the power capacity 413. The controller 215 is operatively coupled to the power supply 255 and the transceiver 205 and 207.

At step 501, the program starts. At step 503, the controller 215 monitors a rate of depletion of the predetermined measure of the power capacity 281. At step 505, the controller 215 determines whether the power capacity 281 is being depleted at a desirable rate or an undesirable rate. In the first embodiment, for example, a desirable rate of depletion 411 for the power capacity 281 is 300 mAHr/Hr of use and an undesirable rate is less than 300 mAHr/Hr of use. The determination of the desirable and undesirable rates of depletion 411 for the power capacity 281 are determined by the power storage capacity of the battery and the current drain needs of the radiotelephone for normal operation. At step 509, the controller 215 permits operation of the transceiver 205 and 207 when the power capacity 281 is being depleted at the desirable rate 411, thereby decreasing the predetermined period of time 405 that the transceiver 205 and 207 is permitted to operate. At step 507, the controller 215 prevents operation of the transceiver 205 and 207 when the power capacity 281 is being depleted at the undesirable rate, thereby prolonging the predetermined period of time 405 that the transceiver 205 and 207 is permitted to operate.

In the first embodiment, the controller 215 may determine that the power capacity 281 is being depleted at the undesirable rate, at step 305, when one of several conditions occur. One condition is when the power capacity 281 is restored, thereby increasing the predetermined period of time that the transceiver 205 and 207 is permitted to operate. Another condition is when the power capacity 281 is maintained, thereby maintaining the predetermined period of time that the transceiver 205 and 207 is permitted to operate. Still another condition is when the power capacity 281 is being depleted at a rate slower than a predetermined rate of depletion, thereby prolonging the predetermined period of time that the transceiver 205 and 207 is permitted to operate.

Additionally, the controller 215 also prevents operation of the transceiver 205 and 207 when the communication resource is substantially depleted, thereby ending the predetermined period of time that the transceiver 205 and 207 is permitted to operate. For example, when the communication resource is the power capacity 281, the power capacity 281 is substantially depleted when the power supply gets to such a low capacity level that the transceiver 205 and 207 no longer have enough power to run.

In the first embodiment, the switch 263 is operatively coupled to the transceiver 205 and 207, the controller 215 and the power supply 255, and adapted to selectively couple the power supply 255 to the transceiver 205 and 207 and the controller 215.

For example, in the case of a disposable radiotelephone 101, a user only pays for a predetermined amount of usage when the disposable radiotelephone 101 is purchased. The predetermined amount of usage may depend on, for example, the predetermined power capacity 281. Consider for a moment that the power capacity 281 is battery capacity. For example, if a battery supplies 600 mA-Hrs and the disposable radiotelephone 101 has a current drain of 300 mA during a call, phone calls totaling 120 minutes could be made during the useful life of the disposable radiotelephone. Without the present invention, a dishonest user could, for example, jumper the battery contacts in order to recharge the battery, maintain the battery capacity at its present level or slow the rate of discharge of the battery capacity, or even replace the old battery with a new battery in order to prolong the predetermined amount of usage of the disposable radiotelephone. However, with the present invention, the controller 215 detects that the rate of depletion of the battery capacity 281 is not depleting according to predetermined expectations, assumes fraud is being attempted and disables the transceiver 205 and 207.

From a more practical point of view, when the disposable radiotelephone 101 is turned on, as represented by block 501, the controller 215 within the disposable radiotelephone 101 measures a terminal battery voltage, as represented by block 503. The information stored in memory 259 as parameter 'K', is either representative of a voltage measured at the end of a previous communication event or representative of an initial battery voltage stored in memory 259 at time of manufacture or time of purchase, if the present communication attempt is the first communication attempt. As depicted by block 505, the controller 215 compares the parameter 'K' with the measured value of the battery voltage. If the parameter 'K' is exceeded, the device is disabled as shown by block 611. If parameter 'K' is not exceeded, the disposable radiotelephone 101 is allowed to initiate communication with the communications system, as shown by block 509. If communication proceeds, the disposable radiotelephone 101 receives data from radiotelephone system 100 to validate the comparison of parameter 'K' accomplished in block 505. If the operation is deemed to be valid, communication is allowed as shown by block 509. If the validation is not endorsed, the communications device is disabled as shown by block 507. Block 503 represents the continuous monitoring of the communications to determine when the communications is over. As soon as communications are complete, the stored parameter "K" representing the battery voltage existing prior to turning the disposable radiotelephone 101 off, is modified with a suitable offset 410 and stored as a new value parameter 'K'. The suitable offset accommodates variances such as temperature, parts aging and tolerance, etc.

Figure 6:
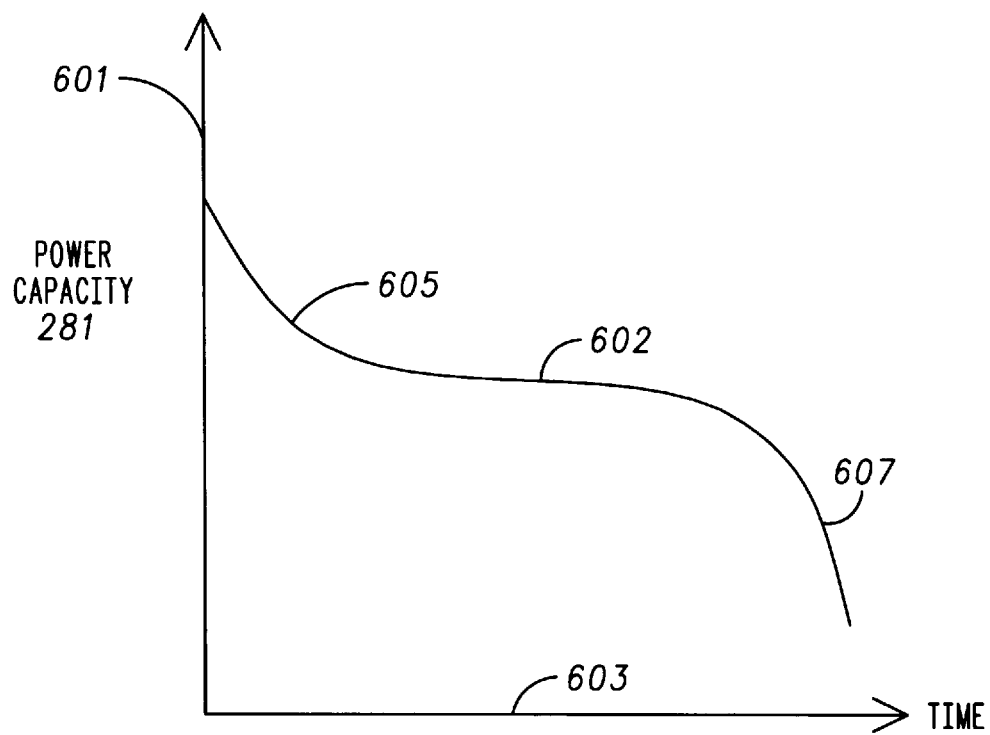
FIG. 6 illustrates a graph to help explain the flow chart of FIG. 5.

FIG. 6 illustrates a graph to explain the flow chart of FIG. 5. FIG. 6 is a graphical representation of typical discharge characteristics of a nickel cadmium (NiCad) battery, for example. The waveform is actually a plot of voltage, scaled in terms of volts on ordinate axis 601, versus a function of time plotted along abscissa axis 603. The curve 602, illustrated in FIG. 6, is the terminal voltage of a battery that is being discharged at a fixed rate. As can be seen from the graph, the voltage is monatonic. The voltage of the battery is constantly decreasing with the rate of the decrease being substantially higher at the initial 605 and final 607 stages of discharge. The battery monitoring unit 257 monitors this curve and provides its output to the controller 215 at line 265. (See FIG. 2) The controller 215 expects to take into account the various rates of power capacity 281 changes over time in order to track the curve 602. The measured terminal voltage of a battery can be used as a suitable indicator of the residual battery capacity, particularly if it is compensated for the temperature and battery type variations. Other shapes of curves may be monitored by the controller 215 and battery monitoring unit 257 for other battery types, as is well known in the art.

Figure 7:
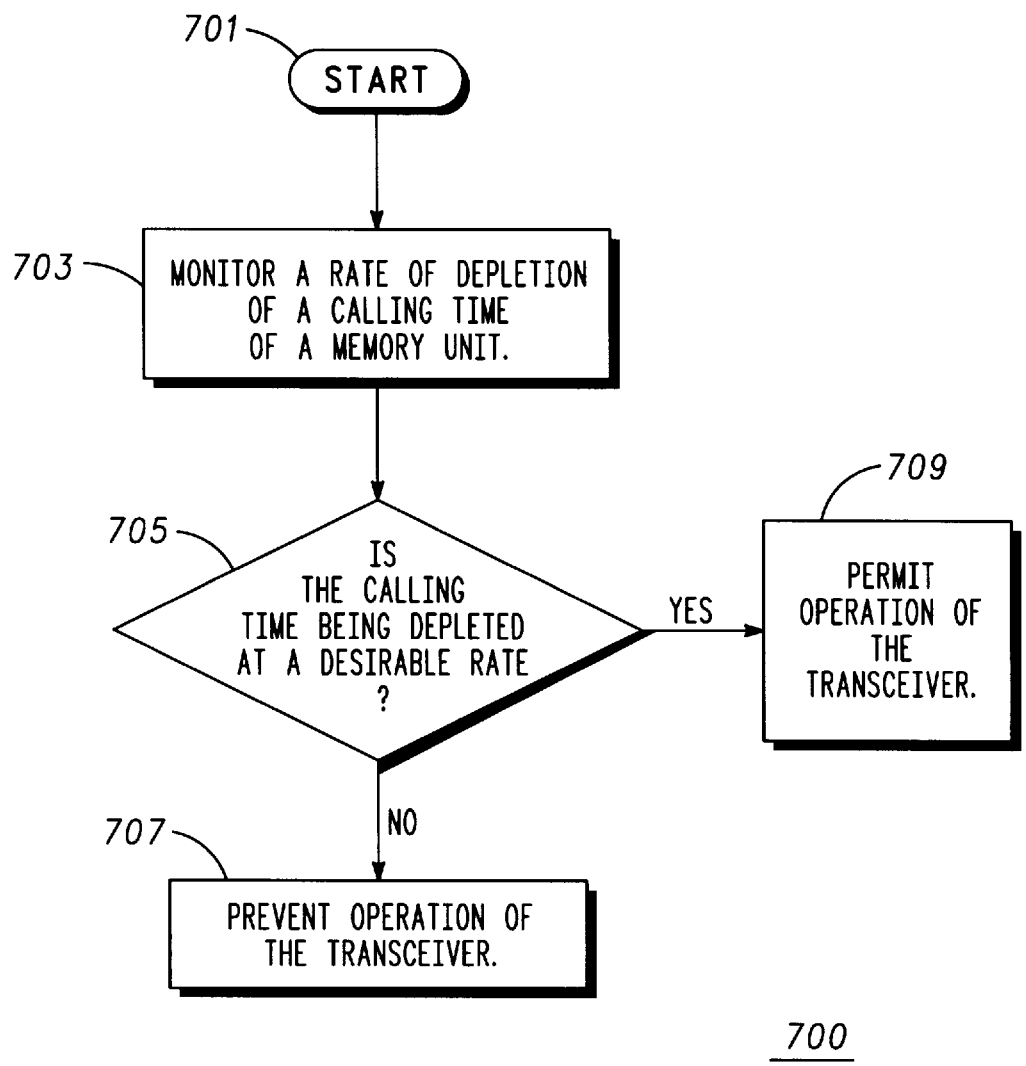
FIG. 7 illustrates a second embodiment of the flow chart of FIG. 3.

FIG. 7 illustrates a second embodiment of the flow chart of FIG. 3. Referring briefly to FIG. 2, in the second embodiment the disposable portable radiotelephone subscriber unit 101 comprises the memory unit 257, the transceiver 205 and 207 and the controller 215. The memory unit 257 has stored therein a predetermined measure of calling time. Calling time is sometimes known as talk-time, calling capacity or time spend during a telephone call. The transceiver 205 and 207 is operatively coupled to the memory unit 257 and permitted to operate for a predetermined period of time 405 responsive to the predetermined measure of the calling time 413. The controller 215 is operatively coupled to the memory unit 257 and the transceiver 205 and 207.

At step 701, the program starts. At step 703, the controller 215 monitors a rate of depletion of the predetermined measure of the calling time 279. At step 705, the controller 215 determines whether the calling time 279 is being depleted at a desirable rate or an undesirable rate. In the second embodiment an example of a desirable rate of depletion 411 for the calling time 279 is 1 min/min of use and an undesirable rate is less than 1 min/min of use. The determination of the desirable and undesirable rates of depletion 411 for the calling time 279 are determined by conventional measurements of the time spent in the call. At step 709, the controller 215 permits operation of the transceiver 205 and 207 when the calling time 279 is being depleted at the desirable rate 411, thereby decreasing the predetermined period of time 405 that the transceiver 205 and 207 is permitted to operate. At step 707, the controller 215 prevents operation of the transceiver 205 and 207 when the calling time 279 is being depleted at the undesirable rate, thereby prolonging the predetermined period of time 405 that the transceiver 205 and 207 is permitted to operate.

In the second embodiment, the disposable portable radiotelephone subscriber unit 101 further comprises a timer 261 operatively coupled to the transceiver 205 and 207 and adapted to determine the calling time for the transceiver 205 and 207. Alternatively, the transceiver 205 and 207 may receive a communication signal 121 from a base station 107 indicative of the calling time for the transceiver 205 and 207.

For example, in the case of a disposable radiotelephone 101, a user only pays for a predetermined amount of usage when the disposable radiotelephone 101 is purchased. The predetermined amount of usage may depend on, for example, the predetermined calling time 279. For example, the memory unit 259 can be programmed to enable a user to make 100 minutes of calls during the useful life of the disposable radiotelephone 101. Without the present invention, a dishonest user could, for example, modify a memory location in the memory 259 where the calling time 279 is stored. However, with the present invention, the controller 215 detects that the rate of depletion of the calling time 279 is not depleting according to predetermined expectations, assumes fraud is being attempted and disables the transceiver 205 and 207. Also, for example, when the communication resource is the calling time 279, the calling time 279 is substantially depleted when the measure of time provided by the real time clock 261 matches the calling time 279.

From a more practical point of view, when the disposable radiotelephone 101 is turned on, as represented by step 701, the controller 215 reads from the memory 259, as represented by block 703. The information read from the memory 259 is the accumulated time duration of use of the disposable radiotelephone 101 since the time of manufacture or time of purchase, for example. As depicted by step 703, the controller 215 compares the accumulated time with the predetermined time limit 279 stored in a different memory location at the time of manufacture or time of sale of the disposable radiotelephone 101, for example. If the calling time 279 is exceeded, the disposable radiotelephone 101 is disabled as represented by step 707. If the calling time 279 is not exceeded, the disposable radiotelephone 101 is allowed to initiate communication with the radiotelephone system 100, as shown by step 709. If communication proceeds, disposable radiotelephone 101 receives data from the radiotelephone system 100 to validate the comparison of time accomplished in step 703. If the operation is deemed to be valid, the disposable radiotelephone 101 is allowed to communicate as shown by step 709. If the validation is not endorsed, the disposable radiotelephone 101 is not allowed to communicate as shown by step 707.

Figure 8:
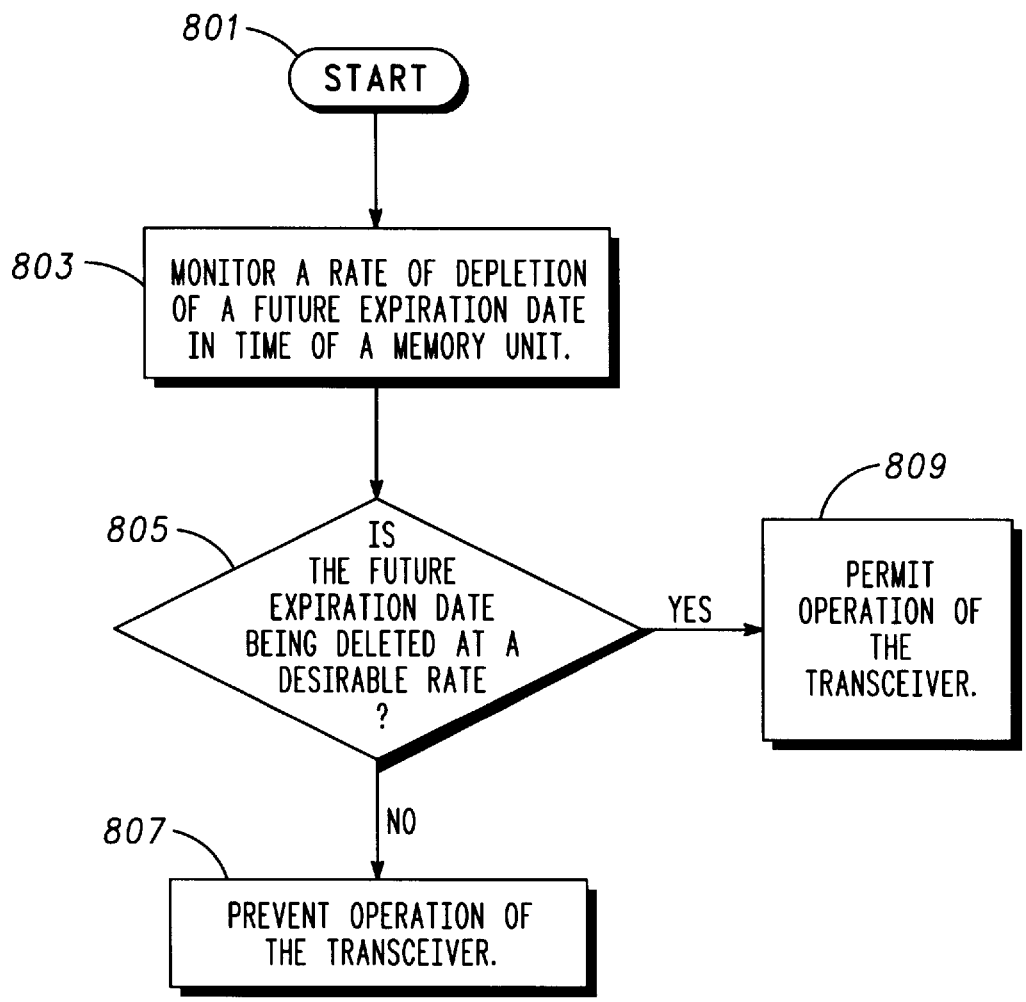
FIG. 8 illustrates a third embodiment of the flow chart of FIG. 3.

FIG. 8 illustrates a third embodiment of the flow chart of FIG. 3. Referring briefly to FIG. 2, in the third embodiment the disposable portable radiotelephone subscriber unit 101 comprises the memory unit 257, the transceiver 205 and 207 and the controller 215. The memory unit 257 has stored therein a predetermined measure of a future expiration date in time 275. A future expiration date in time 275 may otherwise be called an electronic date, a termination date or a predetermined time duration. The transceiver 205 and 207 is operatively coupled to the memory unit 257 and permitted to operate for a predetermined period of time 405 responsive to the predetermined measure of the future expiration date in time 275. The controller 215 is operatively coupled to the memory unit 257 and the transceiver 205 and 207.

At step 801, the program starts. At step 803, the controller 215 monitors a rate of depletion of the predetermined measure of the future expiration date in time 275. At step 805, the controller 215 determines whether the future expiration date in time 275 is being depleted at a desirable rate or an undesirable rate. In the third embodiment an example of a desirable rate of depletion 411 for the future expiration date in time 275 is 1 day/lapsed day and an undesirable rate is less than 1 day/lapsed day. The determination of the desirable and undesirable rates of depletion 411 for the future expiration date in time 275 are determined by conventional measurements of calendar dates. At step 809, the controller 215 permits operation of the transceiver 205 and 207 when the future expiration date in time 275 is being depleted at the desirable rate 411, thereby decreasing the predetermined period of time 405 that the transceiver 205 and 207 is permitted to operate. At step 807, the controller 215 prevents operation of the transceiver 205 and 207 when the future expiration date in time 275 is being depleted at the undesirable rate, thereby prolonging the predetermined period of time 405 that the transceiver 205 and 207 is permitted to operate.

For example, when the communication resource is the expiration date 275, the expiration date 275 is substantially depleted when the time provided by the real time clock 261 matches the expiration date 275.

In the third embodiment, the future expiration date in time 275 is determined responsive to a date when the disposable portable radiotelephone subscriber unit 101 is manufactured. Alternatively, the future expiration date in time 275 is determined wherein the future electronic date in time 275 is responsive to a date when the disposable portable radiotelephone subscriber unit is first activated.

In the third embodiment, the disposable portable radiotelephone subscriber unit 101 is first activated by a provider of a communication system in which the disposable portable radiotelephone subscriber unit 101 operates. Alternatively, the future expiration date in time 275 may be first activated by a user of the disposable portable radiotelephone subscriber unit 101.

In the third embodiment, the memory unit 257 further comprise an identification sequence unique to the disposable portable radiotelephone subscriber unit, wherein the future electronic date in time 275 is embedded within the identification sequence. Preferably, the identification sequence is the electronic serial number (ESN) 271. Alternatively, the identification sequence is a mobile identification number 275.

FIG. 9 illustrates a call sequence message 900 having a generic phone number according to a fourth embodiment for use with the wireless communication device of FIG. 2. When the cellular radiotelephone 101 requests permission to make a phone call on the cellular system 100, it sends call sequence messages of the type depicted in FIG. 9. The call sequence message 900 is generally known in the art and is disclosed in the IS-54 standard in § 2.7. The information elements shown in FIG. 9 are defined as follows:

| | |
|---|---|
| F | First word indication field |
| NAWC | Number of additional words coming field |
| T | Origination/Order field |
| S | ESN field, set to 1 if ESN is sent. |
| ER | Extended protocall reverse channel bit |
| SCM | Station class mark |
| MIN1 | Mobile identification number, first part |
| P | Parity bits |
| LOCAL | Local control field bits |
| ORDQ | Order qualifier field |
| ORDER | Order field |
| LT | Last try code |
| EP | Extended protocall bit |
| MPCI | Mobile type field |
| SDCC1 | Supplementary digital color codes |
| SDCC2 | Supplementary digital color codes |
| MIN2 | Mobile identification number, second part |
| ESN | Electronic serial number |

The generic phone number is located in the conventional locations for MIN1 and MIN2. The generic phone number would be known and typically be assigned by the system operator. The phone number is generic in the sense that the phone number is common to more than one radiotelephone in the same radiotelephone system. Further, the radiotelephones having a generic phone number would typically be used by different users. The generic phone number can be any collection of phone numbers or the same number but they are identified and reserved for use only with a particular class of phones. Thus, the phone number is common to at least one other portable radiotelephone subscriber unit 101 in the same radiotelephone system 102, but the electronic serial number is unique among the plurality of portable radiotelephone subscriber units in the radiotelephone system. Thus, the burden to assign new area codes will not be felt by the phone company.

The system can identify a radiotelephone having a generic phone number when a call is placed by the radiotelephone. However, the system cannot page the radiotelephones having a generic phone number because the all the radiotelephones with the generic number would respond at the same time and the system would not know which phone to route the call to. Therefore, a radiotelephone having a generic phone number cannot receive an incoming phone call.

The generic phone number of the radiotelephone (MIN 1&2) along with it's unique electronic serial number (ESN) are sent to the system with other necessary information for the cellular system to process the request for validity. However, in order to initiate this action of requesting a phone call, the radiotelephone must first obtain service.

In a conventional cellular radiotelephone, the stored program 277 in the memory unit 259, causes the cellular radiotelephone 101 to scan a predetermined number of radio frequency channels upon turn-on and to obtain service on the strongest channel. It may be asked to register on the system by transmitting it's numbers stored in the memory 259.

The generic phone number advantageously permits the system operator to release to the public a large number of radiotelephones without assigning phone numbers to each of them. Further, the radiotelephone having a generic phone number does not burden the system with paging time, since it cannot receive an incoming call. Further, the radiotelephone having a generic phone number is compatible with a conventional system. Therefore, no system changes are needed.

A radiotelephone having a generic phone number can be appropriately applied to a disposable radiotelephone. An operator could issue many disposable telephones without assigning a phone number, not be burdened with paging time and not change system operation. Further, when the fraud prevention techniques including the expiration date are employed within the radiotelephone, a system operator does not bear the computational load of having to monitor the validity of the disposable telephones. The essence of combining features disclosed herein is to provide the marketplace with millions of disposable telephones which do not burden the system and give system operators confidence that fraudulent will be prevented.

Another advantageous feature of the radiotelephone 101 is the lack of standby mode of operation. Since the radiotelephone 101 is not expected to receive calls, battery energy is reserved for making outbound calls.

Yet another advantage of a radiotelephone of this type is there being no need for NAM programming or system activation. Hence, phones may easily be delivered by mail and be usable instantly. The loading of the system by phones of this nature is also minimal.

Yet another advantage of a radiotelephone described herein is that it in order to reduce the liability of fraud, the radiotelephone is programmed with one SID, no roaming capability, and only local use operation.

FIG. 10 illustrates a flow chart 1000 in accordance with the fourth embodiment. At step 1001, the program starts when the phone is turned on.

At step 1002, the controller 215 determines the number of times cumulative, that the cellular phone has been activated, including the present turn on attempt. The controller 215 checks to see if the count exceeds a predetermined number, stored in memory 259. Activation preferably includes turning on the phone, but may alternatively include applying power to the circuits of the phone (via switch 263, for example). This feature is another fraud prevention technique. For example, a radiotelephone is allowed one hundred minutes of talk time. One could estimate that the shortest call could be 15 seconds. Therefore, four hundred turn ON's or power connections are allowed.

If the count is exceeded, the cellular phone is disabled, as depicted by step 1003. Disabling is described with reference to FIG. 2. If the predetermined number of turn on attempts have not been exceeded, the controller 215, activates the keypad 217, as shown in step 1004, to enable the user to enter a desired phone number. Note that at this time, the transceiver 205 and 207 remain off to conserve power. The user is then able to the desired phone number.

At step 1005, if the phone number is entered within a predetermined duration of time, stored in memory 259, the call sequence proceeds to the next step 1006. If a phone number is not entered within the predetermined duration, the phone is turned off as shown in step 1013 to conserve power.

At step 1006, the controller 215 checks the phone number for validity against a predetermined criterion stored in memory 259. For example, this criterion could check to see if the number belongs to a local area covered by the system. If the phone number is deemed valid by the controller, the transceiver is then turned on as shown in step 1007. If the phone number is considered invalid, the phone is turned off as shown in step 1013.

At steps 1008 and 1009, the phone scans the cellular communication system control channels for service and obtains it in the same manner as conventional cellular phones.

Once service is obtained, the phone, as depicted in step 1010, attempts to establish a call by sending a message sequence such as the type shown in FIG. 9, for example. Before a call can be established, the system requests the phone to send a password to validate the call attempt. This is conveyed to the user by the phone as shown in step 1011. When the user enters a password, it is sent to the system for verification.

At step 1012, if the password is deemed to be invalid, the phone is turned off by step 1013. If the password is valid, the call is established, as depicted by step 1014. During the call, the controller continuously monitors the call, as shown in step 1014, to determine if it is terminated by either the cellular phone user or the cellular communication system. If the call is ended, the phone is turned off as shown in step 1013.

Thus, the present invention advantageously provides a cellular radiotelephone having restricted operational characteristics with fraud prevention techniques. The present invention further advantageously provides a cellular phone more easily affordable by a category of users interested in using the cellular communication system on an emergency basis or very infrequent basis. These advantage is provided by the fraud prevention methods and the generic phone number. With the present invention the problems of long term billing, purchasing a permanent communication unit and the problems associated with a conventional communication unit of the prior art are substantially resolved.

While the present invention has been described with reference to illustrative embodiments thereof, it is not intended that the invention be limited to these specific embodiments. Those skilled in the art will recognize that variations and modifications can be made without departing from the spirit and scope of the invention as set forth in the appended claims.

What is claimed is:

1. A disposable wireless communication device comprising:

a storage unit having stored therein a predetermined measure of a communication resource;

communication circuitry operatively coupled to the storage unit and permitted to operate for a predetermined period of time responsive to the predetermined measure of the communication resource; and a controller operatively coupled to the storage unit and the communication circuitry and adapted for:

monitoring a rate of depletion of the communication resource over time, wherein the rate is represented by a desireable rate or an undesireable rate;

permitting operation of the communication circuitry when the communication resource is being depleted at the desirable rate, thereby decreasing the predetermined period of time that the communication circuitry is permitted to operate; and preventing operation of the communication circuitry when the communication resource is being depleted at the undesirable rate, thereby prolonging the predetermined period of time that the communication circuitry is permitted to operate.

2. A disposable wireless communication device according to claim 1 wherein the communication resource is being depleted at the undesirable rate when the communication resource is restored, thereby increasing the predetermined period of time that the communication circuitry is permitted to operate.

3. A disposable wireless communication device according to claim 1 wherein the communication resource is being depleted at the undesirable rate when the communication resource is maintained, thereby maintaining the predetermined period of time that the communication circuitry is permitted to operate.

4. A disposable wireless communication device according to claim 1 wherein the communication resource is being depleted at the undesirable rate when the communication resource is being depleted at a rate slower than a predetermined rate of depletion, thereby prolonging the predetermined period of time that the communication circuitry is permitted to operate.

5. A disposable wireless communication device according to claim 1 wherein the communication resource is being depleted at the undesirable rate when the storage unit is operatively decoupled from the communication circuitry.

6. A disposable wireless communication device according to claim 1 wherein the controller is further adapted for:

counting a number of times the disposable wireless communication device is activated to produce an accumulated count;

comparing the accumulated count to a predetermined count; and preventing operation of the communication circuitry when the accumulated count exceeds the predetermined count.

7. A disposable wireless communication device according to claim 1 wherein the controller is further adapted for:

preventing operation of the communication circuitry when the communication resource is substantially depleted, thereby ending the predetermined period of time that the communication circuitry is permitted to operate.

8. A disposable wireless communication device according to claim 1 wherein the storage unit is a power supply and the communication resource is power capacity.

9. A disposable wireless communication device according to claim 1 wherein the storage unit is a memory unit and the communication resource is time.

10. A disposable wireless communication device according to claim 9 wherein the time is a future date in time.

11. A disposable wireless communication device according to claim 9 wherein the time is communication time.

12. A disposable wireless communication device according to claim 1 wherein the communication circuitry comprises pager circuitry.

13. A disposable wireless communication device according to claim 1 wherein the communication circuitry comprises radiotelephone circuitry.

14. A disposable portable radiotelephone subscriber unit comprising:

a power supply having stored therein a predetermined measure of power capacity;

a transceiver operatively coupled to the power supply and permitted to operate for a predetermined period of time responsive to the predetermined measure of the power capacity; and a controller operatively coupled to the power supply and the transceiver and adapted for:

monitoring a rate of depletion of the predetermined measure of the power capacity over time, wherein the rate is represented by a desireable rate or an undesireable rate;

permitting operation of the transceiver when the power capacity is being depleted at the desirable rate, thereby decreasing the predetermined period of time that the transceiver is permitted to operate; and preventing operation of the transceiver when the power capacity is being depleted the undesirable rate, thereby prolonging the predetermined period of time that the transceiver is permitted to operate.

15. A disposable portable radiotelephone subscriber unit according to claim 14 wherein the power capacity is being depleted at the undesirable rate when the power capacity is restored, thereby increasing the predetermined period of time that the transceiver is permitted to operate.

16. A disposable portable radiotelephone subscriber unit according to claim 14 wherein the power capacity is being depleted at the undesirable rate when the power capacity is maintained, thereby maintaining the predetermined period of time that the transceiver is permitted to operate.

17. A disposable portable radiotelephone subscriber unit according to claim 14 wherein the power capacity is being depleted at the undesirable rate when the power capacity is being depleted at a rate slower than a predetermined rate of depletion, thereby prolonging the predetermined period of time that the transceiver is permitted to operate.

18. A disposable portable radiotelephone subscriber unit according to claim 14 wherein the power capacity is being depleted at the undesirable rate when the power supply is operatively decoupled from at least one of the transceiver and the controller.

19. A disposable portable radiotelephone subscriber unit according to claim 14 wherein the controller is further adapted for:

counting a number of times the disposable portable radiotelephone subscriber unit is activated to produce an accumulated count;

comparing the accumulated count to a predetermined count; and preventing operation of the transceiver when the accumulated count exceeds the predetermined count.

20. A disposable portable radiotelephone subscriber unit according to claim 14 wherein the controller is further adapted for:
preventing operation of the transceiver when the power capacity is substantially depleted, thereby ending the predetermined period of time that the transceiver is permitted to operate.

21. A disposable portable radiotelephone subscriber unit according to claim 14 wherein the power supply is a battery.

22. A disposable portable radiotelephone subscriber unit according to claim 14 wherein the predetermined measure of the power capacity comprises a predetermined measure of voltage.

23. A disposable portable radiotelephone subscriber unit according to claim 14 further comprising:
a switch operatively coupled to the transceiver, the controller and the power supply, and adapted to selectively couple the power supply to the transceiver and the controller.

24. A disposable portable radiotelephone subscriber unit comprising:
a memory unit having stored therein a predetermined measure of calling time;
a transceiver operatively coupled to the memory unit and permitted to operate for a predetermined period of time responsive to the predetermined measure of the calling time; and
a controller operatively coupled to the memory unit and the transceiver and adapted for:
monitoring a rate of depletion of the calling time over time, wherein the rate is represented by a desireable rate or an undesireable rate;
permitting operation of the transceiver when the calling time is being depleted at the desirable rate, thereby decreasing the predetermined period of time that the transceiver is permitted to operate; and
preventing operation of the transceiver when the calling time is being depleted at the undesirable rate, thereby prolonging the predetermined period of time that the transceiver is permitted to operate.

25. A disposable portable radiotelephone subscriber unit according to claim 24 wherein the calling time is being depleted at the undesirable rate when the calling time is restored, thereby increasing the predetermined period of time that the transceiver is permitted to operate.

26. A disposable portable radiotelephone subscriber unit according to claim 24 wherein the calling time is being depleted at the undesirable rate when the calling time is maintained, thereby maintaining the predetermined period of time that the transceiver is permitted to operate.

27. A disposable portable radiotelephone subscriber unit according to claim 24 wherein the calling time is being depleted at the undesirable rate when the calling time is being depleted at a rate slower than a predetermined rate of depletion, thereby prolonging the predetermined period of time that the transceiver is permitted to operate.

28. A disposable portable radiotelephone subscriber unit according to claim 24 wherein the calling time is being depleted at the undesirable rate when the memory unit is operatively decoupled from at least one of the transceiver and the controller.

29. A disposable portable radiotelephone subscriber unit according to claim 24 wherein the controller is further adapted for:
counting a number of times the disposable portable radiotelephone subscriber unit is activated to produce an accumulated count;
comparing the accumulated count to a predetermined count; and
preventing operation of the transceiver when the accumulated count exceeds the predetermined count.

30. A disposable portable radiotelephone subscriber unit according to claim 24 wherein the controller is further adapted for:
preventing operation of the transceiver when the calling time is substantially depleted, thereby ending the predetermined period of time that the transceiver is permitted to operate.

31. A disposable portable radiotelephone subscriber unit according to claim 24 wherein the controller further comprises:
a timer operatively coupled to the transceiver and adapted to determine the calling time for the transceiver.

32. A disposable portable radiotelephone subscriber unit according to claim 24 wherein the transceiver receives a communication signal from a base station indicative of the calling time for the transceiver.

33. A disposable portable radiotelephone subscriber unit comprising:
a memory unit having stored therein a predetermined measure of a future electronic date in time;
a transceiver operatively coupled to the memory unit and permitted to operate for a predetermined period of time responsive to the predetermined measure of the future electronic date in time; and
a controller operatively coupled to the memory unit and the transceiver and adapted for:
monitoring a rate of depletion of the future electronic date in time over time wherein the rate is represented by a desireable rate or an undesireable rate;
permitting operation of the transceiver when the future electronic date in time is being depleted at the desirable rate, thereby decreasing the predetermined period of time that the transceiver is permitted to operate; and
preventing operation of the transceiver when the future electronic date in time is being depleted at the undesirable rate, thereby prolonging the predetermined period of time that the transceiver is permitted to operate.

34. A disposable portable radiotelephone subscriber unit according to claim 33 wherein the future electronic date in time is being depleted at the undesirable rate when the memory unit is operatively decoupled from at least one of the transceiver and the controller.

35. A disposable portable radiotelephone subscriber unit according to claim 33 wherein the controller is further adapted for:
counting a number of times the disposable portable radiotelephone subscriber unit is activated to produce an accumulated count;
comparing the accumulated count to a predetermined count; and
preventing operation of the transceiver when the accumulated count exceeds the predetermined count.

36. A disposable portable radiotelephone subscriber unit according to claim 33 wherein the future electronic date in time is responsive to a date when the disposable portable radiotelephone subscriber unit is manufactured.

37. A disposable portable radiotelephone subscriber unit according to claim 33 wherein the future electronic date in time is responsive to a date when the disposable portable radiotelephone subscriber unit is first activated.

38. A disposable portable radiotelephone subscriber unit according to claim 37 wherein the disposable portable radiotelephone subscriber unit is first activated by a provider of a communication system in which the disposable portable radiotelephone subscriber unit operates.

39. A disposable portable radiotelephone subscriber unit according to claim 37 wherein the disposable portable radiotelephone subscriber unit is first activated by a user of the disposable portable radiotelephone subscriber unit.

40. A disposable portable radiotelephone subscriber unit according to claim 33 wherein the memory unit further comprises:
    an identification sequence the disposable portable radiotelephone subscriber unit, wherein the future electronic date in time is associated within the identification sequence.

41. A disposable portable radiotelephone subscriber unit according to claim 40 wherein the identification sequence is a phone number.

42. A disposable portable radiotelephone subscriber unit according to claim 40 wherein the identification sequence is an electronic serial number.

43. A disposable portable radiotelephone subscriber unit according to claim 33 wherein the controller is further adapted for:
    preventing operation of the transceiver when the future electronic date has expired.

44. A disposable portable radiotelephone subscriber unit comprising:
    a power supply having stored therein a predetermined measure of power capacity;
    a memory unit having stored therein a predetermined measure of a future electronic date in time;
    a transceiver operatively coupled to the power supply and the memory unit and permitted to operate for a predetermined period of time responsive to the predetermined measure of the power capacity and the predetermined measure of the future electronic date in time; and
    a controller operatively coupled to the power supply and the transceiver and adapted for:
        monitoring a rate of depletion of the predetermined measure of the power capacity over time and the predetermined measure of the future electronic date in time over time, wherein the rate is represented by a desireable rate or an undesireable rate;
        permitting operation of the transceiver when the power capacity and the future electronic date in time are being depleted at the desirable rate, thereby decreasing the predetermined period of time that the transceiver is permitted to operate; and
        preventing operation of the transceiver when at least one of the power capacity and the future electronic date in time is being depleted at the undesirable rate, thereby prolonging the predetermined period of time that the transceiver is permitted to operate.

45. A disposable portable radiotelephone subscriber unit comprising:
    a memory unit having stored therein a predetermined measure of calling time over time and a predetermined measure of a future electronic date in time over time, wherein the rate is represented by a desireable rate or an undesireable rate;
    a transceiver operatively coupled to the memory unit and permitted to operate for a predetermined period of time responsive to the calling time and the future electronic date in time; and
    a controller operatively coupled to the memory unit and the transceiver and adapted for:
        monitoring a rate of depletion of the calling time and the future electronic date in time;
        permitting operation of the transceiver when the calling time and the future electronic date in time are being depleted at the desirable rate, thereby decreasing the predetermined period of time that the transceiver is permitted to operate; and
        preventing operation of the transceiver when at least one of the calling time and the future electronic date in time is being depleted at the undesirable rate, thereby prolonging the predetermined period of time that the transceiver is permitted to operate.

46. A method for operating a disposable wireless communication device comprising the steps of:
    monitoring a rate of depletion of a communication resource stored in a storage unit over time, wherein the rate is represented by a desireable rate or an undesireable rate;
    permitting operation of communication circuitry when the communication resource is being depleted at the desirable rate, thereby decreasing a predetermined period of time that the communication circuitry is permitted to operate; and
    preventing operation of the communication circuitry when the communication resource is being depleted at the undesirable rate, thereby prolonging the predetermined period of time that the communication circuitry is permitted to operate.

47. A method according to claim 46 wherein the communication resource is being depleted at the undesirable rate when the communication resource is restored, thereby increasing the predetermined period of time that the communication circuitry is permitted to operate.

48. A method according to claim 46 wherein the communication resource is being depleted at the undesirable rate when the communication resource is maintained, thereby maintaining the predetermined period of time that the communication circuitry is permitted to operate.

49. A method according to claim 46 wherein the communication resource is being depleted at the undesirable rate when the communication resource is being depleted at a rate slower than a predetermined rate of depletion, thereby prolonging the predetermined period of time that the communication circuitry is permitted to operate.

50. A method according to claim 46 wherein the communication resource is being depleted at the undesirable rate when the storage unit is operatively decoupled from the communication circuitry.

51. A method according to claim 46 further comprising the steps of:
    counting a number of times the disposable wireless communication device is activated to produce an accumulated count;
    comparing the accumulated count to a predetermined count; and
    preventing operation of the communication circuitry when the accumulated count exceeds the predetermined count.

52. A method according to claim 46 further comprising the step of:

preventing operation of the communication circuitry when the communication resource is substantially depleted, thereby ending the predetermined period of time that the communication circuitry is permitted to operate.

53. A method according to claim 46 wherein the storage unit is a power supply and the communication resource is power capacity.

54. A method according to claim 46 wherein the storage unit is a memory unit and the communication resource is time.

55. A method according to claim 54 wherein the time is a future date in time.

56. A method according to claim 54 wherein the time is communication time.

57. A method according to claim 46 wherein the communication circuitry comprises pager circuitry.

58. A method according to claim 46 wherein the communication circuitry comprises radiotelephone circuitry.

59. A method for operating a disposable portable radiotelephone subscriber unit comprising the steps of:

monitoring, by a controller, a rate of depletion of a predetermined measure of a power capacity stored in a power supply over time, wherein the rate is represented by a desireable rate or an undesireable rate;

permitting, by the controller, operation of a transceiver when the power capacity is being depleted at the desirable rate, thereby decreasing a predetermined period of time that the transceiver is permitted to operate; and preventing, by the controller, operation of the transceiver when the power capacity is being depleted at the undesirable rate, thereby prolonging the predetermined period of time that the transceiver is permitted to operate.

60. A method according to claim 57 wherein the power capacity is being depleted at the undesirable rate when the power capacity is restored, thereby increasing the predetermined period of time that the transceiver is permitted to operate.

61. A method according to claim 57 wherein the power capacity is being depleted at the undesirable rate when the power capacity is maintained, thereby maintaining the predetermined period of time that the transceiver is permitted to operate.

62. A method according to claim 57 wherein the power capacity is being depleted at the undesirable rate when the power capacity is being depleted at a rate slower than a predetermined rate of depletion, thereby prolonging the predetermined period of time that the transceiver is permitted to operate.

63. A method according to claim 57 wherein the power capacity is being depleted at the undesirable rate when the power supply is operatively decoupled from at least one of the transceiver and the controller.

64. A method according to claim 59 further comprising the steps of:

counting a number of times the disposable portable radiotelephone subscriber unit is activated to produce an accumulated count;

comparing the accumulated count to a predetermined count; and preventing operation of the transceiver when the accumulated count exceeds the predetermined count.

65. A method according to claim 57 further comprising the step of:

preventing operation of the transceiver when the power capacity is substantially depleted, thereby ending the predetermined period of time that the transceiver is permitted to operate.

66. A method according to claim 57 further comprising the step of:

selectively coupling the power supply to the transceiver.

67. A method of operating a disposable portable radiotelephone subscriber unit comprising the steps of:

monitoring, by a controller, a rate of depletion of a calling time stored in a memory unit over time, wherein the rate is represented by a desireable rate or an undesireable rate;

permitting, by the controller, operation of a transceiver when the calling time is being depleted at the desirable rate, thereby decreasing a predetermined period of time that the transceiver is permitted to operate; and preventing, by the controller, operation of the transceiver when the calling time is being depleted at the undesirable rate, thereby prolonging the predetermined period of time that the transceiver is permitted to operate.

68. A method according to claim 65 wherein the calling time is being depleted at the undesirable rate when the calling time is restored, thereby increasing the predetermined period of time that the transceiver is permitted to operate.

69. A method according to claim 65 wherein the calling time is being depleted at the undesirable rate when the calling time is maintained, thereby maintaining the predetermined period of time that the transceiver is permitted to operate.

70. A method according to claim 65 wherein the calling time is being depleted at the undesirable rate when the calling time is being depleted at a rate slower than a predetermined rate of depletion, thereby prolonging the predetermined period of time that the transceiver is permitted to operate.

71. A method according to claim 65 wherein the calling time is being depleted at the undesirable rate when the memory unit is operatively decoupled from at least one of the transceiver and the controller.

72. A method according to claim 67 further comprising the steps of:

counting a number of times the disposable portable radiotelephone subscriber unit is activated to produce an accumulated count;

comparing the accumulated count to a predetermined count; and preventing operation of the transceiver when the accumulated count exceeds the predetermined count.

73. A method according to claim 65 further comprising the step of:

preventing operation of the transceiver when the calling time is substantially depleted, thereby ending the predetermined period of time that the transceiver is permitted to operate.

74. A method according to claim 65 further comprising the step of:

determining the accumulated calling time for the transceiver.

75. A method according to claim 65 further comprising the step of:

receiving a communication signal from a base station indicative of the calling time for the transceiver.

76. A method for operating a disposable portable radiotelephone subscriber unit comprising the steps of:

monitoring, by a controller, a rate of depletion of a future electronic date in time stored in a memory unit over time, wherein the rate is represented by a desireable rate or an undesireable rate;

permitting, by the controller, operation of a transceiver when the future electronic date in time is being depleted at the desirable rate, thereby decreasing a predetermined period of time that the transceiver is permitted to operate; and preventing, by the controller, operation of the transceiver when the future electronic date in time is being depleted at the undesirable rate, thereby prolonging the predetermined period of time that the transceiver is permitted to operate.

77. A method according to claim 74 wherein the future electronic date in time is being depleted at the undesirable rate when the memory unit is operatively decoupled from at least one of the transceiver and the controller.

78. A method according to claim 76 further comprising the steps of:

counting a number of times the disposable portable radiotelephone subscriber unit is activated to produce an accumulated count;

comparing the accumulated count to a predetermined count; and preventing operation of the transceiver when the accumulated count exceeds the predetermined count.

79. A method according to claim 74 wherein the future electronic date in time is responsive to a date when the disposable portable radiotelephone subscriber unit is manufactured.

80. A method according to claim 74 wherein the future electronic date in time is responsive to a date when the disposable portable radiotelephone subscriber unit is first activated.

81. A method according to claim 78 wherein the disposable portable radiotelephone subscriber unit is first activated by a provider of a communication system in which the disposable portable radiotelephone subscriber unit operates.

82. A method according to claim 78 wherein the disposable portable radiotelephone subscriber unit is first activated by a user of the disposable portable radiotelephone subscriber unit.

83. A method according to claim 74 further comprising the step of:

preventing operation of the transceiver when the future electronic date has expired.

84. A method for operating a disposable portable radiotelephone subscriber unit comprising the steps of:

monitoring a rate of depletion of a predetermined measure of a power capacity stored in a power supply over time and a predetermined measure of a future electronic date in time stored in a memory unit over time, wherein the rate is represented by a desireable rate or an undesireable rate;

permitting operation of a transceiver when the power capacity and the future electronic date in time are being depleted at the desirable rate, thereby decreasing the predetermined period of time that the transceiver is permitted to operate; and preventing operation of the transceiver when at least one of the power capacity and the future electronic date in time is being depleted at the undesirable rate, thereby prolonging the predetermined period of time that the transceiver is permitted to operate.

85. A method for operating a disposable portable radiotelephone subscriber unit comprising the steps of:

monitoring a rate of depletion of a calling time stored in a memory unit over time and a future electronic date in time stored in the memory unit over time, wherein the rate is represented by a desireable rate or an undesireable rate;

permitting operation of a transceiver when the calling time and the future electronic date in time are being depleted at the desirable rate, thereby decreasing a predetermined period of time that the transceiver is permitted to operate; and preventing operation of the transceiver when at least one of the calling time and the future electronic date in time is being depleted at the undesirable rate, thereby prolonging the predetermined period of time that the transceiver is permitted to operate.

\* \* \* \* \*

UNITED STATES PATENT AND TRADEMARK OFFICE
CERTIFICATE OF CORRECTION

PATENT NO. : 5,815,807  
DATED : November 2, 1998  
INVENTOR(S) : Osmani

Page 1 of 1

It is certified that error appears in the above-identified patent and that said Letters Patent is hereby corrected as shown below:

Column 25,
Lines 36, 41, 46, 52 and 66, please replace "57" with -- 59 --.

Column 26,
Line 5, please replace "57" with -- 59 --.
Lines 22, 27, 32, 38, 51, 57 and 61, please replace "65" with -- 67 --.

Column 27,
Lines 15, 28 and 32, please replace "74" with -- 76 --.
Lines 36 and 40, please replace "78" with -- 80 --.

Column 28,
Line 1, please replace "74" with -- 76 --.

Signed and Sealed this

Twenty-fifth Day of November, 2003

JAMES E. ROGAN
*Director of the United States Patent and Trademark Office*